US012466441B2

(12) United States Patent
Araki et al.

(10) Patent No.: US 12,466,441 B2
(45) Date of Patent: Nov. 11, 2025

(54) VEHICLE CONTROL APPARATUS FOR NEGOTIATING GRADE CROSSINGS

(71) Applicant: DENSO CORPORATION, Kariya (JP)

(72) Inventors: Ryotaro Araki, Kariya (JP); Kenji Kato, Kariya (JP); Yohei Masui, Kariya (JP); Yuta Komoguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 714 days.

(21) Appl. No.: 17/144,028

(22) Filed: Jan. 7, 2021

(65) Prior Publication Data

US 2021/0129867 A1    May 6, 2021

Related U.S. Application Data

(63) Continuation of application No. PCT/JP2019/024287, filed on Jun. 19, 2019.

(30) Foreign Application Priority Data

Jul. 12, 2018  (JP) ................. 2018-132162

(51) Int. Cl.
*B60W 60/00*     (2020.01)
*B60W 30/18*     (2012.01)

(52) U.S. Cl.
CPC .. *B60W 60/0027* (2020.02); *B60W 30/18159* (2020.02); *B60W 60/0011* (2020.02);
(Continued)

(58) Field of Classification Search
None
See application file for complete search history.

(56) References Cited

U.S. PATENT DOCUMENTS

2005/0012603 A1*  1/2005  Ewerhart ............... B60Q 9/006
                                                          340/435
2013/0261950 A1* 10/2013  Sasabuchi ............. G01S 17/931
                                                          342/70
(Continued)

FOREIGN PATENT DOCUMENTS

DE    102010012954 A1    9/2011
JP       2005-165643 A    6/2005
(Continued)

OTHER PUBLICATIONS

Merged Foreign and English Translation of JP6457826B2 (Year: 2015).*

(Continued)

*Primary Examiner* — James J Lee
*Assistant Examiner* — Andrew Sang Kim
(74) *Attorney, Agent, or Firm* — Maschoff Brennan

(57) ABSTRACT

A vehicle control apparatus is mounted in a vehicle and controls the vehicle. The vehicle control apparatus detects an obstacle that is present inside a grade crossing that intersects a traveling course of the vehicle, using a detection result of a sensor that is mounted in the vehicle. The vehicle control apparatus identifies a position and size of the obstacle using a detection result of the vehicle control apparatus, and calculates a clearance in a direction that intersects the traveling course when the vehicle crosses the grade crossing, using the identified position and size of the obstacle. The (Continued)

vehicle control apparatus determines whether the vehicle is able to pass through the grade crossing based on the calculated clearance.

2 Claims, 17 Drawing Sheets

(52) U.S. Cl.
CPC ..... *B60W 60/0017* (2020.02); *B60W 2552/53* (2020.02); *B60W 2554/4029* (2020.02); *B60W 2554/4041* (2020.02); *B60W 2554/4042* (2020.02)

(56) References Cited

U.S. PATENT DOCUMENTS

| | | | | |
|---|---|---|---|---|
| 2014/0365104 | A1* | 12/2014 | Sasaki | B60W 30/18154 701/119 |
| 2015/0210312 | A1* | 7/2015 | Stein | G05D 1/0246 701/41 |
| 2016/0280236 | A1 | 9/2016 | Otsuka | |
| 2017/0066444 | A1* | 3/2017 | Habu | G05D 1/0246 |
| 2019/0080599 | A1* | 3/2019 | Ishikawa | G06V 20/582 |
| 2020/0012286 | A1* | 1/2020 | Delp | G05D 1/249 |
| 2020/0247399 | A1* | 8/2020 | Tanahashi | B60W 60/0016 |
| 2020/0377083 | A1* | 12/2020 | Kokaki | B60W 60/0016 |
| 2021/0237769 | A1* | 8/2021 | Ostafew | B60W 30/18159 |

FOREIGN PATENT DOCUMENTS

| | | |
|---|---|---|
| JP | 2005-202678 A | 7/2005 |
| JP | 2005-326963 A | 11/2005 |
| JP | 2006-39928 A | 2/2006 |
| JP | 2017-004214 A | 1/2017 |
| JP | 2018-5386 A | 1/2018 |
| JP | 2018001962 A | 1/2018 |
| WO | WO-2018063245 A1 * | 4/2018 ............. G01C 21/30 |

OTHER PUBLICATIONS

Konno, Sachiko, et al. "Psychological Analysis of Railway Crossing Accident Occurrence (1)—Car Driver Behavior in Railway Crossing Accident—", The Japanese Journal of Ergonomics, May 16, 1993, vol. 29, special edition, pp. 362-363.

* cited by examiner

SECOND EMBODIMENT

VEHICLE CONTROL APPARATUS FOR NEGOTIATING GRADE CROSSINGS

CROSS-REFERENCE TO RELATED APPLICATIONS

The present application is a continuation application of International Application No. PCT/JP2019/024287, filed Jun. 19, 2019, which claims priority to Japanese Patent Application No. 2018-132162, filed Jul. 12, 2018. The contents of these applications are incorporated herein by reference in their entirety.

BACKGROUND

Technical Field

The present disclosure relates to control of a vehicle when the vehicle passes through a grade crossing.

Background Art

Automated driving control in which steering, braking, and the like are automatically performed to avoid an obstacle ahead of a vehicle, using various sensors that detect position, size, speed, and the like of the obstacle is advancing.

SUMMARY

One aspect of the present disclosure provides a vehicle control apparatus that is mounted in a vehicle and controls the vehicle. The vehicle control apparatus detects an obstacle that is present inside a grade crossing that intersects a traveling course of the vehicle, using a detection result of a sensor that is mounted in the vehicle. The vehicle control apparatus identifies a position and size of the obstacle using a detection result of the vehicle control apparatus, and calculates a clearance in a direction that intersects the traveling course when the vehicle crosses the grade crossing, using the identified position and size of the obstacle. The vehicle control apparatus determines whether the vehicle is able to pass through the grade crossing based on the calculated clearance.

DESCRIPTION OF THE EMBODIMENTS

Figure 1:
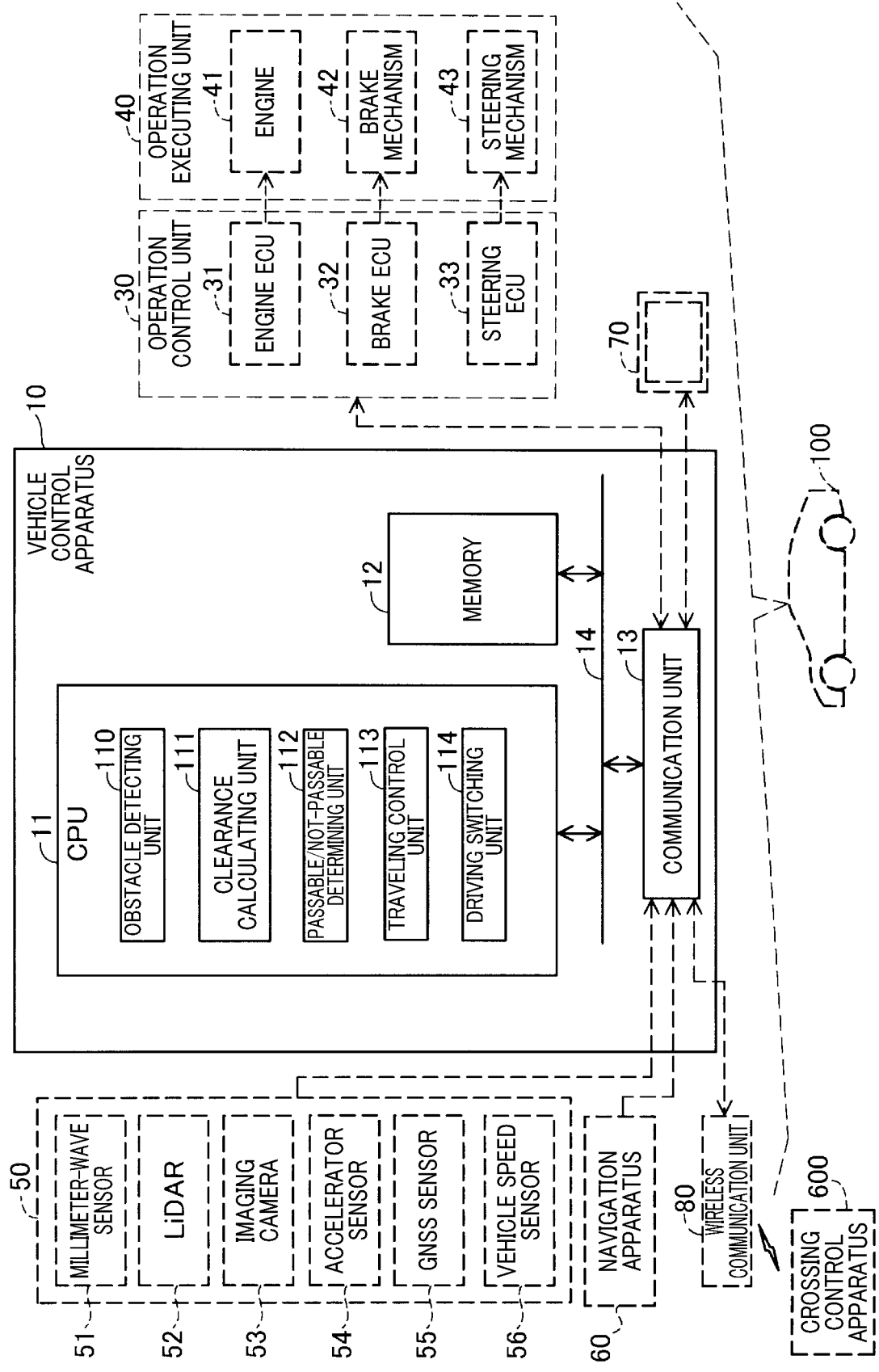
FIG. 1 is a block diagram of an overall configuration of a vehicle in which a vehicle control apparatus according to an embodiment of the present disclosure is mounted.

Automated driving control in which steering, braking, and the like are automatically performed to avoid an obstacle ahead of a vehicle, using various sensors that detect position, size, speed, and the like of the obstacle is advancing. As such automated driving control, automated driving control when the vehicle passes through a grade crossing is proposed in JP-A-2017-004214.

Specifically, a technology is proposed in which, when a vehicle passes through a grade crossing, whether an own vehicle is able to pass is determined using various types of information, such as an open/close state of the grade crossing, a state of traffic on a road beyond the grade crossing, a positional relationship between the grade crossing and the own vehicle, and a positional relationship between the vehicle and a vehicle ahead. When the vehicle is determined to be unable to pass, driving of the own vehicle restricted. In addition, guidance information based on the determination result is outputted.

However, in JP-A-2017-004214, a state inside the grade crossing, such as a size of a road width inside the grade crossing, and presence/absence of pedestrians and bicycles passing through the grade crossing, is not considered. Therefore, in cases in which the road width inside the grade crossing is narrow or a walking path is not present, a space between a pedestrian, a bicycle, or the like passing through the grade crossing and the own vehicle is small. A problem arises in that the own vehicle cannot safely pass.

In addition, in JP-A-2017-004214, a vehicle speed at which the vehicle passes through the grade crossing is not considered at all. Therefore, the vehicle may pass by a pedestrian or a bicycle at a high speed. As a result of such issues, a problem arises in that pedestrians and bicycle riders experience anxiety. Therefore, a technology that is able to improve safety when a vehicle passes through a grade crossing is desired.

The present disclosure can be implemented according to the embodiments below.

A first exemplary embodiment of the present disclosure provides a vehicle control apparatus that is mounted in a vehicle and controls the vehicle. The vehicle control apparatus includes: an obstacle detecting unit that detects an obstacle that is present inside a grade crossing that intersects a traveling course of the vehicle, using a detection result of a sensor that is mounted in the vehicle; a clearance calculating unit that identifies a position and size of the obstacle using a detection result of the obstacle detecting unit, and calculates a clearance in a direction that intersects the traveling course when the vehicle crosses the grade crossing, using the identified position and size of the obstacle; and a passing decision unit that determines whether the vehicle is able to pass through the grade crossing based on the calculated clearance.

In the vehicle control apparatus according to this exemplary embodiment, the clearance in the direction intersecting the traveling course when the vehicle crosses the grade crossing is calculated based on the identified position and size of the obstacle, and whether the vehicle is able to pass through the grade crossing is determined using the clearance. Therefore, safety when the vehicle passes through the grade crossing can be improved.

A second exemplary embodiment of the present disclosure provides a vehicle control apparatus that is mounted in a vehicle and controls the vehicle. The vehicle control apparatus includes: a clearance calculating unit that identifies a position and size of an obstacle that is present inside a grade crossing that intersects a traveling course of the vehicle using a detection result of a sensor that detects an obstacle that is present in a periphery of the vehicle, and calculates a clearance in a direction that intersects the traveling course when the vehicle crosses the grade crossing, using the identified position and size of the obstacle; and a vehicle speed determining unit that determines a passage speed that is a vehicle speed at which the vehicle passes through the grade crossing, using the calculated clearance.

In the vehicle control apparatus according to this exemplary embodiment, the clearance in the direction intersecting the traveling course when the vehicle crosses the grade crossing is calculated, and the passage speed when the vehicle passes through the grade crossing is determined using the clearance. Therefore, safety when the vehicle passes through the grade crossing can be improved.

The present disclosure can also be implemented according to various embodiments other than the vehicle control apparatus. For example, the present disclosure can be implemented according to embodiments such as a vehicle in which the vehicle control apparatus is mounted, a vehicle control method, a crossing passage method, a crossing passage determination method, a vehicle speed determination method, a computer program for implementing these methods, and a storage medium that stores therein the computer program.

A. First Embodiment

A1. Apparatus Configuration

A vehicle control apparatus 10 shown in FIG. 1 is mounted in a vehicle 100 and controls the vehicle 100. According to the present embodiment, to differentiate the vehicle 100 from other vehicles, the vehicle 100 is also referred to as an "own vehicle 100." The vehicle 100 is configured to be capable of switching between automated driving and manual driving.

Automated driving refers to driving in which at least a portion of control related to traveling of the vehicle 100 is automatically performed without determination by a driver. For example, among driving levels 0 to 5 that are prescribed by the Society of Automotive Engineers (SAE), driving at levels 2 to 5 corresponds to automated driving.

Manual driving refers to driving in which at least a portion of control related to traveling of the vehicle is performed based on determination and operation by the driver. For example, driving at levels 0 to 2 based on the SAE corresponds to manual driving.

In addition to the vehicle control apparatus 10, an operation control unit 30, an operation executing unit 40, a sensor group 50, a navigation apparatus 60, a display unit 70, and a wireless communication unit 80 are mounted in the vehicle 100.

The operation control unit 30 controls the operation executing unit 40. The operation executing unit 40 is a functional unit that performs traveling, steering, and braking of the vehicle 100.

The operation executing unit 40 includes an engine 41, a brake mechanism 42, and a steering mechanism 43. The brake mechanism 42 is composed of an apparatus group (actuator) that is related to brake control, such as a sensor, a motor, a valve, a pump, and the like. The steering mechanism 43 is composed of an apparatus group (actuator) that is related to steering, such as a power steering motor.

The operation control unit 30 includes an engine electronic control unit (ECU) 31, a brake ECU 32, and a steering ECU 33.

The engine ECU 31 controls the engine 41. Specifically, the engine ECU 31 controls an opening/closing operation of a throttle valve, an ignition operation of an igniter, an opening/closing operation of an intake valve, and the like by controlling various actuators (not shown).

The brake ECU 32 determines a timing at which to apply a brake and a brake amount (braking amount), and controls each of the apparatuses that configure the brake mechanism 42 such that the determined brake amount is achieved at the determined timing.

The steering ECU 33 determines a steering amount (steering angle) based on measurement values that are acquired from a yaw rate sensor and a steering angle sensor (not shown) that are mounted in the vehicle 100, and controls each of the apparatuses that configure the steering mechanism 43 such that the determined steering amount is achieved.

The sensor group 50 includes a millimeter-wave sensor 51, a light detection and ranging (LiDAR) 52, an imaging camera 53, an accelerator sensor 54, a global navigation satellite system (GNSS) sensor 55, and a vehicle speed sensor 56.

The millimeter-wave sensor 51 detects a presence/absence of an object in a periphery of the own vehicle 100, a distance between the object and the own vehicle 100, a position of the object, a size of the object, a shape of the object, and a relative speed of the object in relation to the own vehicle 100.

The millimeter-wave sensor 51 detects an object that is more accurately a collection of a plurality of detection points (targets).

The LiDAR 52 detects a presence/absence of an object in the periphery of the own vehicle and the like using laser.

The imaging camera 53 faces outside the own vehicle 100 and acquires a captured image. As the imaging camera 53, a monocular camera may be used. In addition, a stereo camera or a multi-camera that is configured by two or more cameras may be used.

The acceleration sensor 54 detects acceleration of the own vehicle 100.

The GNSS sensor 55 is configured by, for example, a global positioning system (GPS) sensor, and detects a current position of the own vehicle based on radio waves that are received from an artificial satellite that configures the GPS.

The vehicle speed sensor 56 detects a vehicle speed of the own vehicle 100.

When a destination is set by a user of the own vehicle 100, the navigation apparatus 60 performs retrieval of a course from the current position of the own vehicle 100 to the destination, and output of sound or an image to guide the own vehicle 100 to the course that is set. For example, a map image or a route image that is displayed on the map image corresponds to an image that is used to guide the own vehicle 100 to the course.

The navigation apparatus 60 outputs the image to the display unit 70. Here, the sound that is used to guide the own vehicle 100 to the course that is set is outputted from a speaker (not shown) that is mounted in the vehicle 100.

The wireless communication unit 80 performs wireless communication with an apparatus other than the own vehicle 100 that is capable of wireless communication. As described hereafter, according to the present embodiment, the wireless communication unit 80 performs wireless communication with a crossing control apparatus 600.

The display unit 70 displays various screens that are related to driving of the own vehicle 100, such as a menu screen, the map image, and various messages. For example, the display unit 70 is configured by a liquid crystal display and may be set in an instrument panel.

The wireless communication unit 80 is configured by, for example, a communication apparatus that is capable of performing communication based on a wireless communication service that is provided by a telecommunications carrier, such as a fourth-generation mobile communication system (4G) or a fifth-generation mobile communication system (5G), or a communication apparatus that is capable of performing wireless local area network (LAN) communication based on IEEE 802.11 standards.

The vehicle control apparatus 10 is configured by an ECU that includes a central processing unit (CPU) 11, a memory 12, and a communication unit 13. The CPU 11, the memory 12, and the communication unit 13 are all connected to a bus 14 and capable of communicating with one another. The CPU 11 functions as an obstacle detecting unit 110, a clearance calculating unit 111, a passable/not-passable determining unit (corresponding to a passing decision unit) 112, a traveling control unit 113, and a driving switching unit 114 by running a control program that is stored in the memory 12 in advance.

The clearance calculating unit 111 calculates a clearance in a direction that is orthogonal to a traveling course when the own vehicle 100 passes through a grade crossing. Details of a calculation method for the clearance will be described hereafter.

The passable/not-passable determining unit 112 determines whether the own vehicle 100 is able to pass through a grade crossing using the clearance calculated by the clearance calculating unit 111. Details of the determination will be described hereafter.

The traveling control unit 113 transmits a command that is related to the operation of the own vehicle 100 to the operation control unit 30 during automated driving. For example, the traveling control unit 113 causes the own vehicle 100 to travel at a vehicle speed that is set. As described hereafter, according to the present embodiment, a vehicle speed (also referred to, hereafter, as a "passage speed") when the own vehicle 100 passes through a grade crossing is set as a predetermined value in advance. Therefore, in this case, the traveling control unit 113 causes the own vehicle 100 to travel at the predetermined passage speed that is set.

The driving switching unit 114 switches between manual driving and automated driving. Specifically, the driving switching unit 114 switches between manual driving and automated driving by assigning at least a portion of authority that is related to control that is related to traveling of the vehicle to the user (driver) or to the traveling control unit 113.

The communication unit 13 is connected to a network inside the own vehicle 100 and communicates with each of the above-described operation control unit 30, sensor group 50, navigation apparatus 60, and wireless communication unit 80. For example, an arbitrary network that can be provided in a vehicle, such as controller area network (CAN), FlexRay prescribed by the FlexRay Consortium, or Ethernet (registered trademark), may be used as the network inside the own vehicle 100. In addition, the communication unit 13 includes a functional unit that implements a protocol suite for connecting to the network.

In the own vehicle 100, safety when the own vehicle 100 passes through a grade crossing is improved by the vehicle control apparatus 10 performing a crossing passage process, described hereafter.

A2. Crossing Passage Process

When the own vehicle 100 arrives at a vicinity of a grade crossing during automated driving, the vehicle control apparatus 10 performs the crossing passage process. More specifically, according to the present embodiment, a sign for a grade crossing is detected based on the detection results of the millimeter-wave sensor 51 and the imaging camera 53. Subsequently, when the own vehicle 100 reaches a position that is before a stop line of the grade crossing by a predetermined distance, the crossing passage process is started. Here, the crossing passage process may be performed with the current position of the own vehicle 100 that is detected by the GNSS sensor 55 reaching a set position on the course that is before the crossing by a predetermined distance as a trigger.

Figure 2:
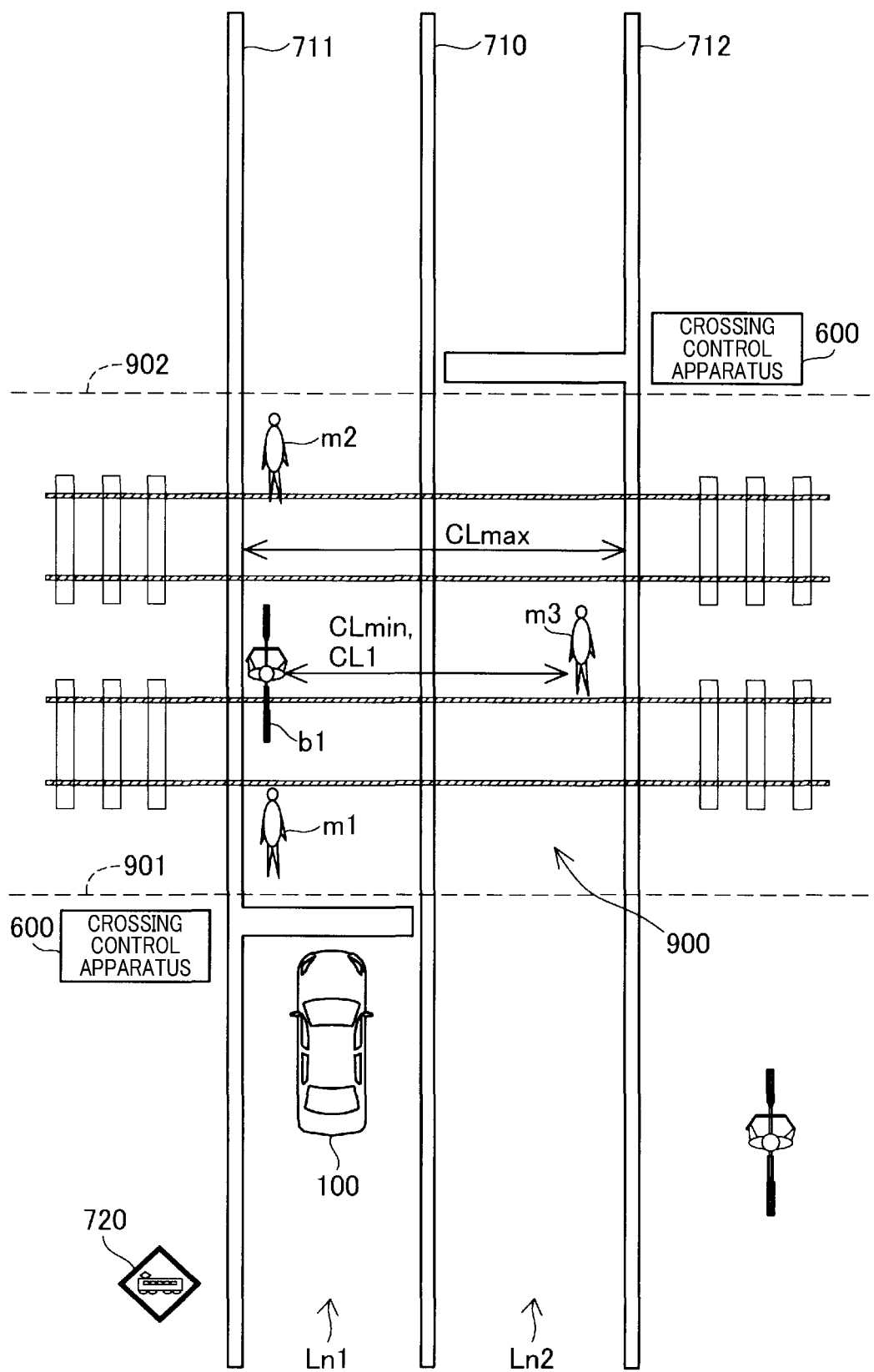
FIG. 2 is an explanatory diagram of an example of a state in which an own vehicle passes through a grade crossing according to a first embodiment.

In an example in FIG. 2, the own vehicle 100 has stopped at a stop line before a grade crossing 900 and is about to pass through the grade crossing 900. Here, according to the present embodiment, the vehicle is driven based on traffic regulations stipulating traveling on a left side. Inside the grade crossing 900, three pedestrians m1, m2, and m3, and a single bicycle b1 are present. A vehicle other than the vehicle 100 is not present in a traffic lane Ln1 in which the vehicle 100 is traveling. In addition, no other vehicle is present in a traffic lane Ln2 that is an opposing lane, as well. Here, FIG. 2 is merely an example. A number of pedestrians is not limited to three and may be an arbitrary number such as zero, two, or four.

In addition, a number of bicycles is also not limited to one and may be an arbitrary number such as zero, two or three. Furthermore, an arbitrary type of moving body that is not limited to the bicycle may be present inside the grade crossing 900. For example, a two-wheeled motorcycle, a three-wheeled motorcycle, a cart or the like may be present inside the grade crossing 900. Here, according to the present embodiment, the grade crossing 900 refers to an area that is sandwiched by boundary portions on both edges of the road in a width direction and by crossing gates (not shown) in an advancing direction. Specifically, an area in the width direction of the grade crossing 900 is an area that is surrounded by a white line 711 on the left side of the traffic lane Ln1 when facing ahead and a white line 712 on the left side of the traffic lane Ln2 when facing ahead.

In addition, an area in the advancing direction of the grade crossing 900 is an area that is surrounded by a virtual line 901 that is an extension of a center axis of a crossing gate (not shown) that is to the front when viewed from the vehicle 100 and a virtual line 902 that is an extension of a center axis of a crossing gate (not shown) that is to the back when viewed from the vehicle 100. Here, a center line 710 is provided between the traffic lane Ln1 and the traffic lane Ln2.

In addition, a crossing control apparatus 600 is arranged on a road shoulder in the vicinity of the grade crossing 900. The crossing control apparatus 600 includes, in addition to a control unit that controls an opening/closing operation of the crossing gate (not shown), a communication unit for communicating with a management apparatus of a railway company, and a wireless communication unit that performs wireless communication. The crossing control apparatus 600 is capable of acquiring various types of information related to the grade crossing 900 from the management apparatus of the railway company. For example, a length of the grade crossing 900, scheduled opening/closing times of the grade crossing, and the like correspond to the information related to the grade crossing 900. According to the present embodiment, the "length of the grade crossing 900" refers to a length of the grade crossing 900 along the traffic lane Ln1.

Figure 3:
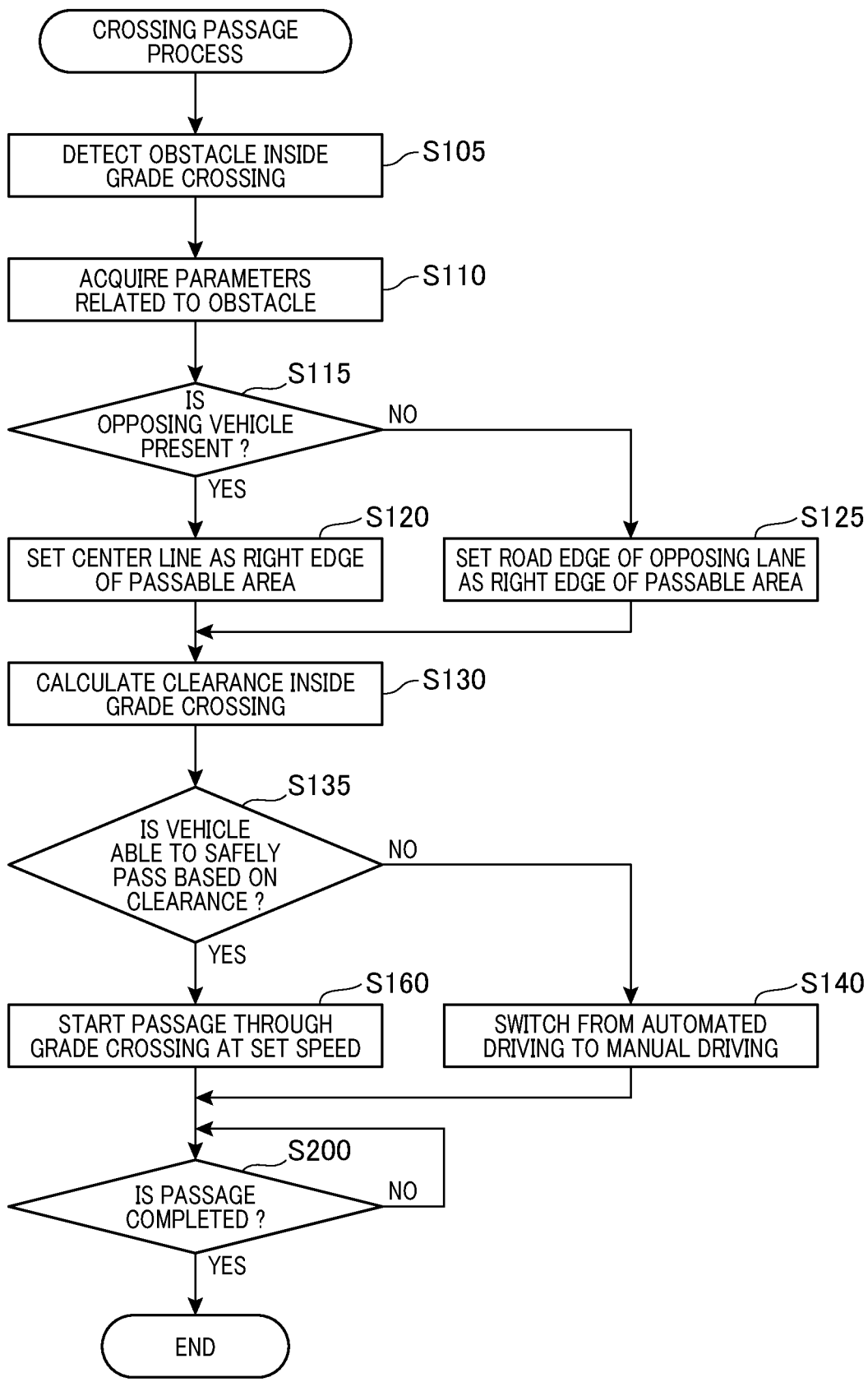
FIG. 3 is a flowchart of the steps in a crossing passage process according to the first embodiment.

As shown in FIG. 3, the obstacle detecting unit 110 detects an obstacle that is present inside the grade crossing 900 using the detection results from the sensor group 50 (step S105).

The clearance calculating unit 111 acquires various parameters that are related to each obstacle detected at step S105, using the detection values of the sensor group 50 (step S110). A type, position, size, movement speed, movement acceleration, and the like of the obstacle correspond to the various types of parameters. In the example in FIG. 2, the various types of parameters are respectively acquired for the three pedestrians m1, m2, and m3, and the single bicycle b1.

As shown in FIG. 3, the clearance calculating unit 111 determines whether an opposing vehicle is present in the opposing lane using the detection results of the sensor group 50 (step S115). When determined that an opposing vehicle is present (YES at step S115), the clearance calculating unit 111 sets the center line 710 as a right edge of a passable area (step S120). Conversely, when determined that an opposing vehicle is not present (NO at step S115), the clearance calculating unit 111 sets a road edge of the opposing lane, that is, the white line 712 as the right edge of the passable area (step S125).

The "passable area" refers to a maximum area through which the own vehicle 100 is able to pass when an obstacle such as a pedestrian is not present, when the own vehicle 100 passes through the grade crossing 900. When an opposing vehicle is not present, the own vehicle 100 can also cross the center line 710 and travel in the traffic lane Ln2. Therefore, in this case, the right edge of the passable area is set to the right edge of the traffic lane Ln2 when viewed from the vehicle 100, that is, the white line 712. Conversely, when an opposing vehicle is present, the own vehicle 100 cannot cross the center line 710 and travel in the traffic lane Ln2. Therefore, in this case, the right edge of the passable area is set to the right edge of the traffic lane Ln1, that is, the center line 710.

After above-described step S120 or S125 is performed, the vehicle 100 calculates the clearance inside the grade crossing 900 using the parameters related to the obstacles acquired at step S110 (step S130). The clearance inside the grade crossing 900 refers to a clearance inside the grade crossing 900 in a direction (also referred to, hereafter, as an "intersecting direction") that is orthogonal to the traffic lane Ln1 when the vehicle 100 passes through the grade crossing 900. For example, in the example in FIG. 2, an area inside the grade crossing 900 between the white line 711 and the white line 712 in a position in which the three pedestrians m1 to m3 and the bicycle b1 are not present corresponds to a maximum clearance CLmax inside the grade crossing 900.

Figure 4:
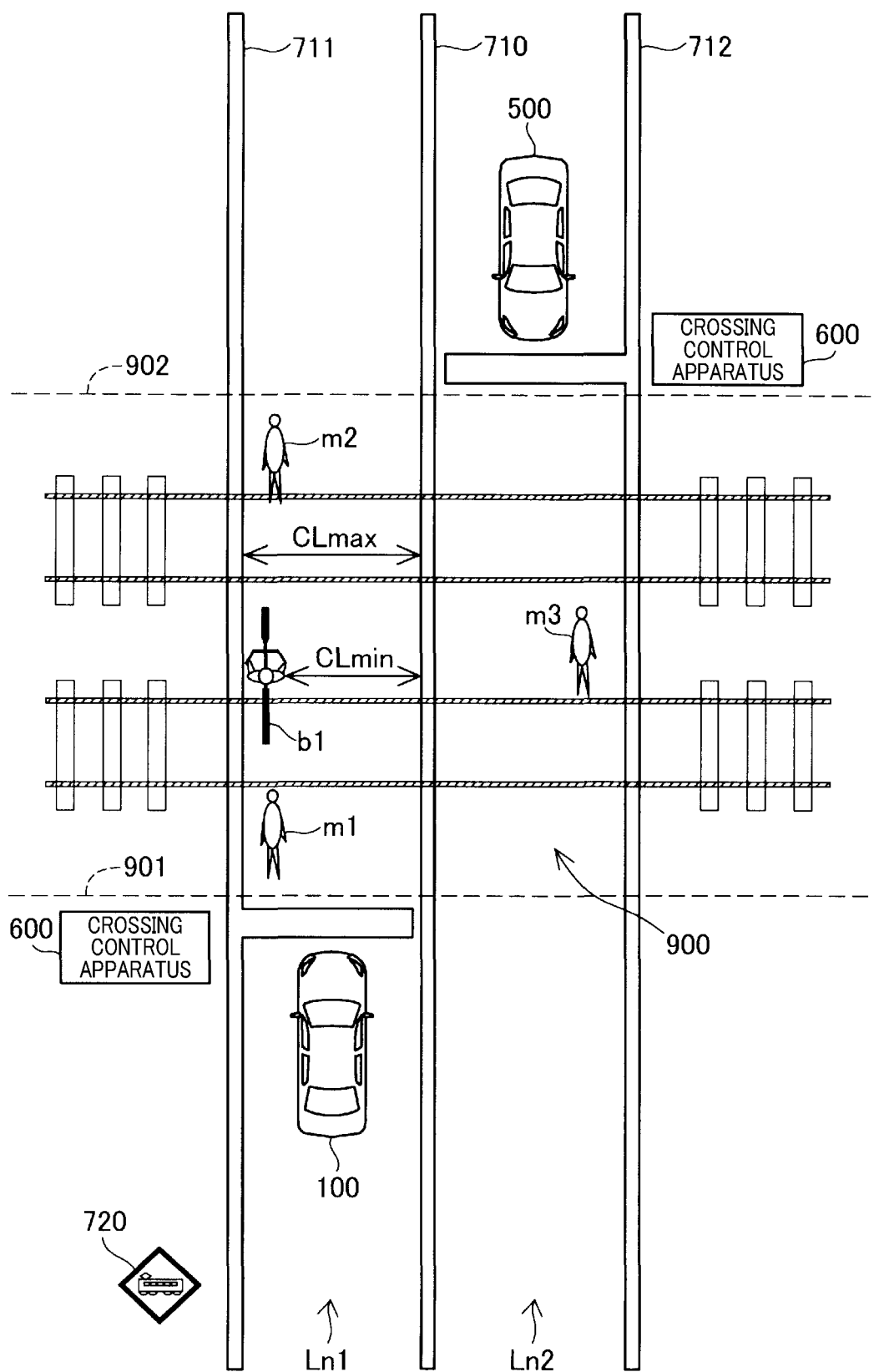
FIG. 4 is an explanatory diagram of another example of a state in which the own vehicle passes through a grade crossing according to the first embodiment.

In addition, a clearance in a position in which the bicycle b1 that is traveling in the traffic lane Ln1 and the pedestrian m3 that is traveling in the traffic lane Ln2 overlap in the intersecting direction corresponds to a minimum clearance CLmin. Furthermore, for example, in an example in FIG. 4, unlike that in the example in FIG. 2, an opposing vehicle 500 is stopped at a stop line on a side opposite the own vehicle 100 with the grade crossing 900 therebetween. In this case, step S125 is performed, and the right edge of the passable area is set to the center line 710. Therefore, an area inside the grade crossing 900 between the white line 711 and the center line 710 in a position in which the three pedestrians m1 to m3 and the bicycle b1 are not present corresponds to the maximum clearance CLmax.

In addition, a distance in the intersecting direction between the bicycle b1 that is positioned closest to the center line 710 among the two pedestrians m1 and m2 and the bicycle b1, and the center line 710 corresponds to the minimum clearance CLmin. Here, the intersecting direction is not limited to the direction that is orthogonal to the traffic lane Ln1 and may be an arbitrary direction that is not parallel to the traffic lane Ln10. When the own vehicle 100 passes through the grade crossing 900 along this direction, the clearance can be accurately calculated.

At step S130 according to the present embodiment, of the clearances that change moment by moment, the minimum clearance at each time is calculated in time series and stored. More specifically, the clearance calculating unit 111 estimates, in time series, the minimum clearance CLmin into a future that amounts to at least an amount of time required for the vehicle 100 to pass through the grade crossing 900 and stores the estimated minimum clearances CLmin in the memory 12.

Figure 5:
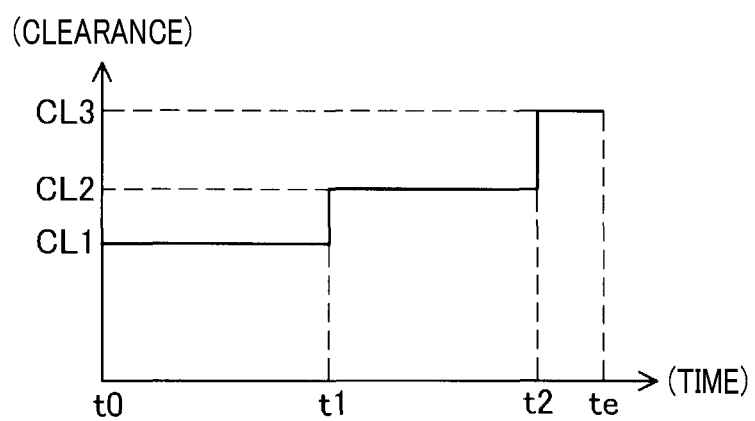
FIG. 5 is an explanatory diagram of an example of a clearance calculated at step S130.

For example, in FIG. 5, changes in time series in the clearance that is calculated in the state in FIG. 2 are shown. Specifically, with passage through the grade crossing 900 being started at time t0 and completed at time te, the minimum clearance that is calculated (estimated) into the future is shown.

As shown in FIG. 2, the minimum clearance at time t0 is a distance CL1 in the intersecting direction between the bicycle b1 and the pedestrian m3. Subsequently, as a result of the bicycle b1 and the pedestrian m3 moving in directions opposite each other, overlapping of the bicycle b1 and the pedestrian m3 in the intersecting direction is canceled at time t1. At this time, for example, the minimum clearance is a distance CL2 in the intersecting direction between the pedestrian m1 and the white line 712. Furthermore, subsequently, at time t2 at which the pedestrian m1 completes passing through the grade crossing 900, the minimum clearance is a distance CL3 in the intersecting direction between the white line 711 and the white line 712.

Calculation (estimation) of the minimum clearance such as that described above is performed by a trajectory of each obstacle being estimated based on the size (width in the intersecting direction), speed, and acceleration of each obstacle acquired at step S110, and the trajectory and the positions of the white line 711 and the center line 710 being used. In addition, the "amount of time required for the vehicle 100 to pass through the grade crossing 900" is prescribed in advance according to the present embodiment. For example, 30 seconds may be set as the amount of time. Of course, the amount of time is not limited to 30 seconds and may be set to an arbitrary amount of time.

As shown in FIG. 3, the passable/not-passable determining unit 112 determines whether the own vehicle 100 is able to safely pass through the grade crossing 900 based on the clearance calculated at step S130 (step S135). Specifically, when the clearance over an overall period during which the own vehicle 100 is passing through the grade crossing 900 is equal to or greater than a predetermined size, the passable/not-passable determining unit 112 determines that the own vehicle 100 is able to pass through the grade crossing.

More specifically, the passable/not-passable determining unit 112 determines that the own vehicle 100 is able to safely pass when a smallest value of the clearances calculated at step S130 is equal to or greater than a predetermined size, and determines that the own vehicle 100 is not able to safely pass when the smallest value is less than the predetermined size. This "predetermined size" is a value that is obtained by a predetermined margin being added to a vehicle width of the own vehicle 100. For example, the predetermined margin may be 50 cm. Of course, the predetermined margin is not limited to 50 cm and may be an arbitrary value.

When the own vehicle 100 is determined to be able to safely pass through the grade crossing 900 (YES at step S135), the traveling control unit 113 causes the vehicle 100 to travel at the speed that s set and starts passage through the grade crossing 900 (step S160). According to the present embodiment, the passage speed is set in advance and stored in the memory 12. For example, 10 kilometers per hour may be the passage speed. Of course, the passage speed is not limited to 10 kilometers per hour and may be an arbitrary speed.

The traveling control unit 113 waits until passage through the grade crossing is completed (step S200). When passage through the grade crossing is determined to be completed (YES at step S200), the crossing passage process is ended. When the vehicle 100 is determined to not be able to safely pass through the grade crossing 900 at above-described step S135 (NO at step S135), the driving switching unit 114 switches from automated driving to manual driving (step S140). According to the present embodiment, control of all operation functions related to traveling of the own vehicle 100 is assigned to the user (driver). At this time, for example, a message that indicates switching from automated driving to manual driving is displayed in the display unit 70.

Alternatively, the message may be outputted as sound from a speaker (not shown) that is mounted in the own vehicle 100. When driving is switched to manual driving as a result of step S140, the driver can make the own vehicle 100 wait at the stop line for a timing at which the own vehicle 100 is able to pass, while determining whether the own vehicle 100 is able to pass using sight and the like. When determined that the own vehicle 100 is able to pass, the driver can operate the own vehicle 100 themselves and make the own vehicle 100 pass through the grade crossing 900. After step S140, above-described step S200 is performed.

In the vehicle control apparatus 100 according to the first embodiment described above, the clearance in the direction intersecting the traveling course when the own vehicle 100 crosses the grade crossing 900 is calculated based on the position, size, speed, and acceleration of the identified obstacle. Whether the own vehicle 100 is able to pass through the grade crossing 900 is determined using the clearance. Therefore, safety when the own vehicle 100 passes through the grade crossing 900 can be improved.

In addition, the clearance when the own vehicle 100 passes through the grade crossing 900 is calculated in time series. When the clearance is equal to or greater than the predetermined size over the overall period during which the own vehicle 100 is passing through the grade crossing 900, the own vehicle 100 is determined to be able to pass through the grade crossing. Therefore, safety when the vehicle passes through the grade crossing is further improved.

In addition, when determined that the own vehicle 100 is not able to pass through the grade crossing 900, control of all operation functions related to driving of the own vehicle 100 is assigned to the driver. Therefore, the driver can operate the vehicle by controlling the operation functions as they intend. Therefore, for example, the driver can perform control so as to make the own vehicle 100 wait until the own vehicle 100 is determined to be able to pass through the grade crossing 900.

B. Second Embodiment

Figure 6:
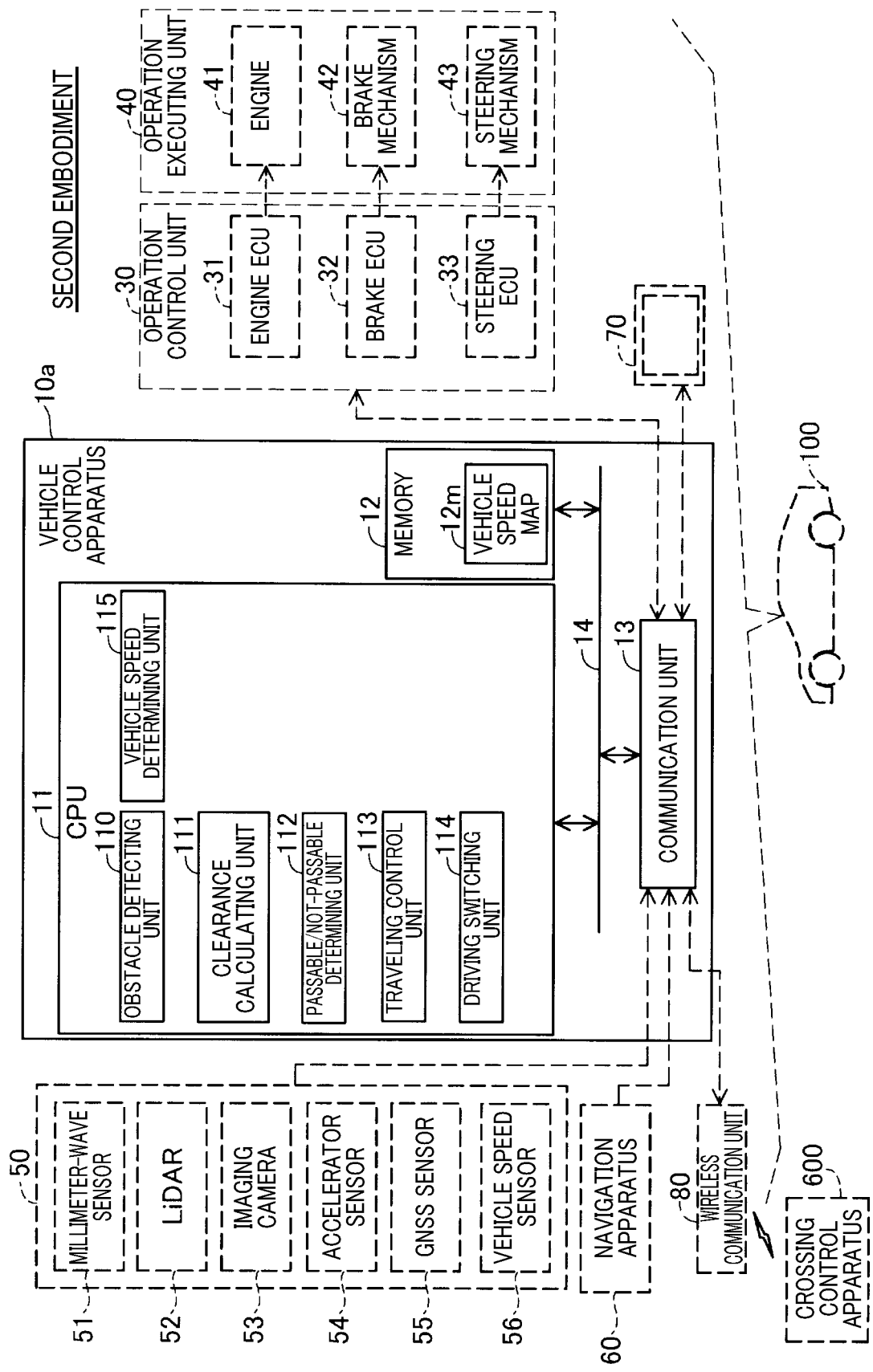
FIG. 6 is a block diagram of an overall configuration of a vehicle in which a vehicle control apparatus according to a second embodiment is mounted.

A vehicle control apparatus 10a according to a second embodiment shown in FIG. 6 differs from the vehicle control apparatus 10 according to the first embodiment shown in FIG. 1 in that the CPU 11 functions as a vehicle speed determining unit 115 and a vehicle speed map 12m is stored in the memory 12 in advance. Other configurations of the vehicle control apparatus 10a according to the second embodiment are identical to those of the vehicle control apparatus 10. Therefore, identical constituent elements are given the same reference numbers and detailed descriptions thereof are omitted.

The vehicle speed determining unit 115 determines the vehicle speed when the own vehicle 100 passes through the grade crossing 900, that is, the passage speed. At this time, the vehicle speed determining unit 115 determines the passage speed with reference to the vehicle speed map 12m.

Figure 7:
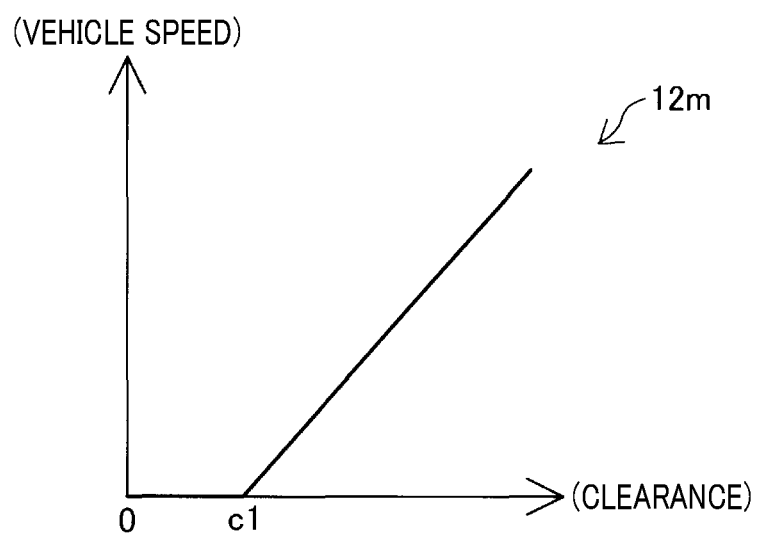
FIG. 7 is an explanatory diagram of an example of setting content of a vehicle speed map according to the second embodiment.

As shown in FIG. 7, the clearance and the vehicle speed are set in association in the vehicle speed map 12m. As shown in FIG. 7, when the clearance is less than a clearance c1, a vehicle speed 0 (zero) is associated. The clearance c1 is a value that serves as a threshold when whether the own vehicle 100 is able to safely pass through the grade crossing 900 is determined at step S135. As shown in FIG. 7, when the clearance is equal to or greater than the clearance c1, the vehicle speed is a value that is greater than 0 (zero). In addition, when the clearance is equal to or greater than the clearance c1, the vehicle speed is set to increase in proportion to the clearance.

Figure 8:
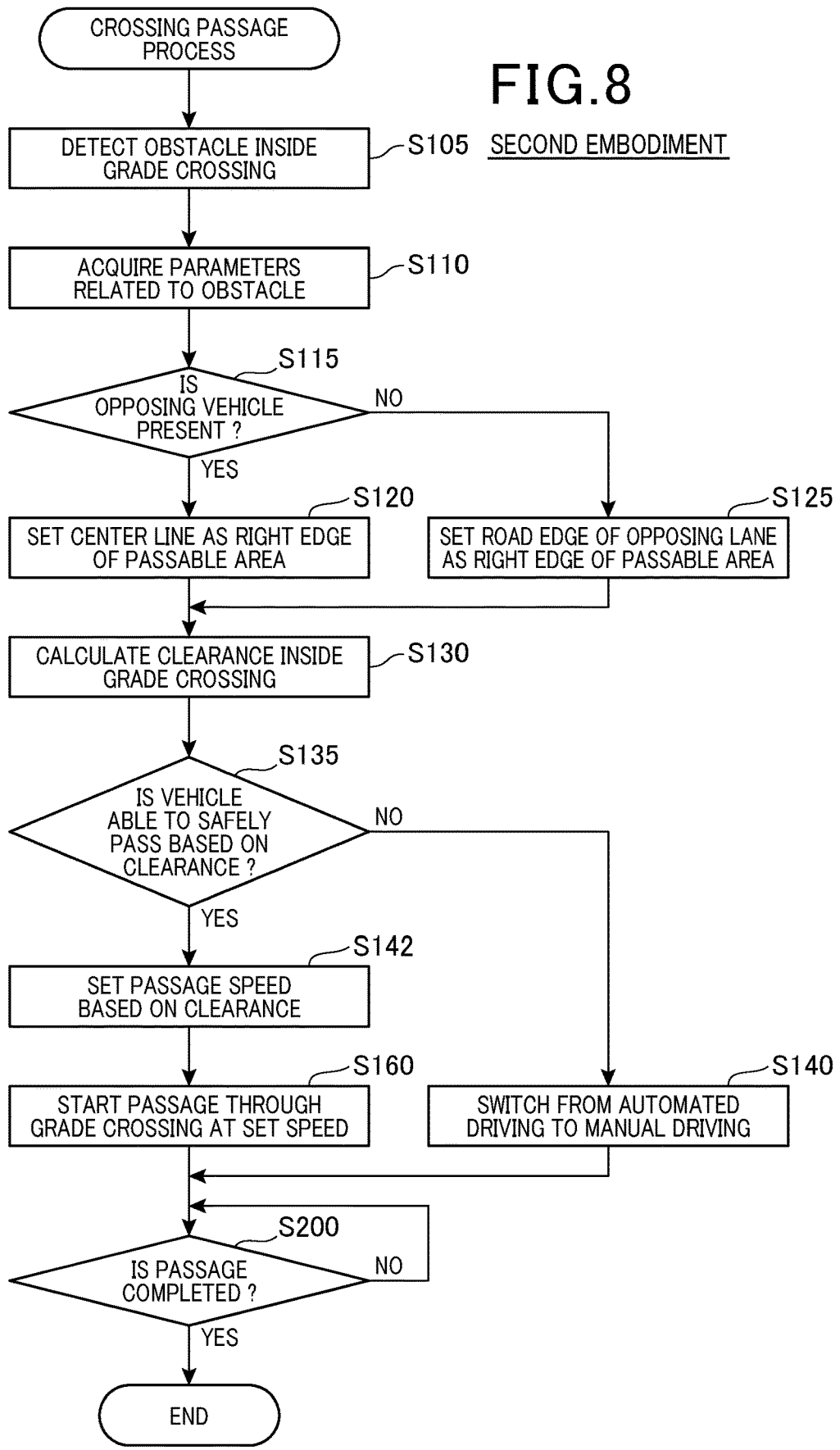
FIG. 8 is a flowchart of the steps in a crossing passage process according to the second embodiment.

As shown in FIG. 8, a crossing passage process according to the second embodiment differs from the crossing passage process according to the first embodiment in that step S142 is additionally performed. Other steps in the crossing passage process according to the second embodiment are identical to those in the crossing passage process according to the first embodiment. Identical steps are given the same reference numbers and detailed descriptions thereof are omitted.

At step S135, when determined that the vehicle 100 is able to safely pass through the grade crossing 900 (YES at step S135), the vehicle speed determining unit 115 references the vehicle speed map 12m and sets the passage speed based on the clearance calculated at step S130 (step S142). Therefore, at step S160 that is subsequently performed, control is performed such that the own vehicle 100 passes through the grade crossing 900 at the passage speed set at step S142.

The vehicle control apparatus 10a according to the second embodiment, described above, achieve effects similar to those of the vehicle control apparatus 10 according to the first embodiment. In addition, the passage speed when the own vehicle 100 passes through the grade crossing 900 is determined using the calculated clearance. Therefore, safety when the own vehicle 100 passes through the grade crossing 900 can be improved. Furthermore, the passage speed is set to a higher value as the clearance increases. Therefore, the amount of time over which the vehicle 100 passes through the grade crossing 900 can be suppressed from becoming excessively long, while safety is ensured.

C. Third Embodiment

Figure 9:
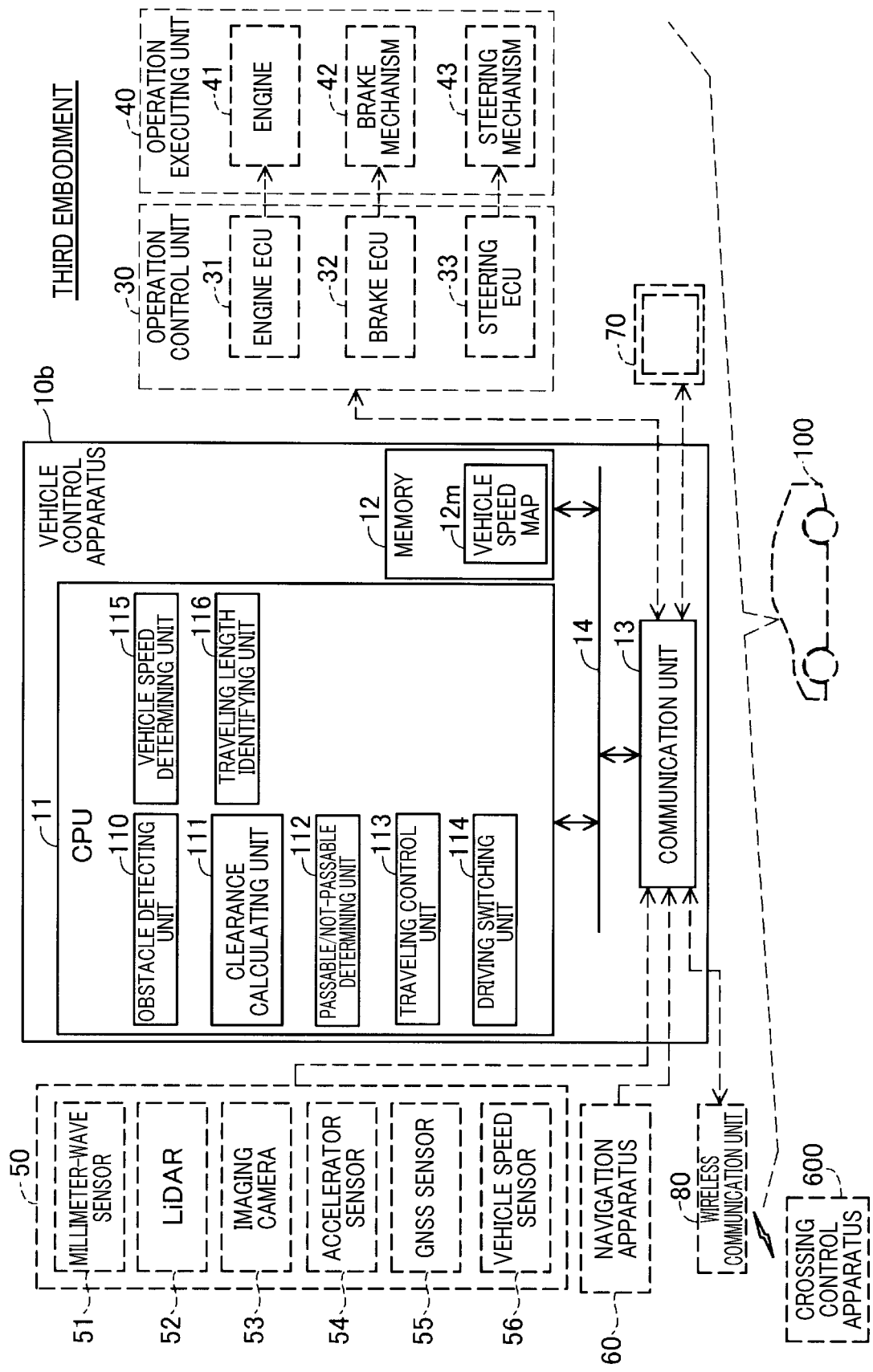
FIG. 9 is a block diagram of an overall configuration of a vehicle in which a vehicle control apparatus according to a third embodiment is mounted.

A vehicle control apparatus 10b according to a third embodiment shown in FIG. 9 differs from the vehicle control apparatus 10 according to the second embodiment shown in FIG. 6 in that the CPU 11 functions as a traveling length identifying unit 116. Other configurations of the vehicle control apparatus 10b according to the third embodiment are identical to those of the vehicle control apparatus 10a. Therefore, identical constituent elements are given the same reference numbers and detailed descriptions thereof are omitted.

The traveling length identifying unit 116 identifies a length (referred to, hereafter, as a "traveling length") over which the own vehicle 100 travels when the own vehicle 100 passes through the grade crossing 900. According to the present embodiment, the traveling length identifying unit 116 acquires the traveling length by receiving information related to the length of the grade crossing 900 from the crossing control apparatus 600 by wireless communication via the wireless communication unit 80.

Figure 10:
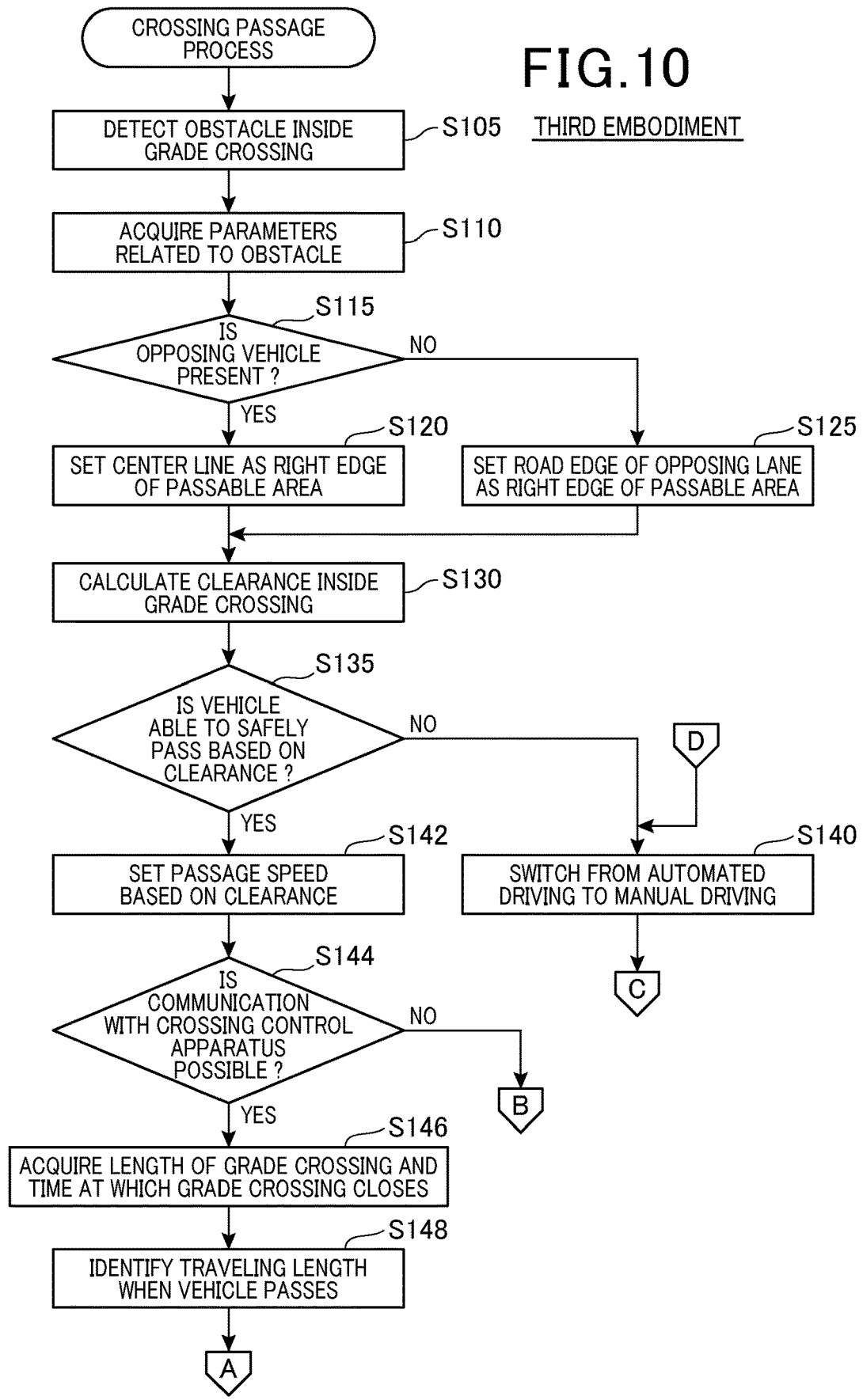
FIG. 10 is a flowchart of the steps in a crossing passage process according to the third embodiment.
Figure 11:
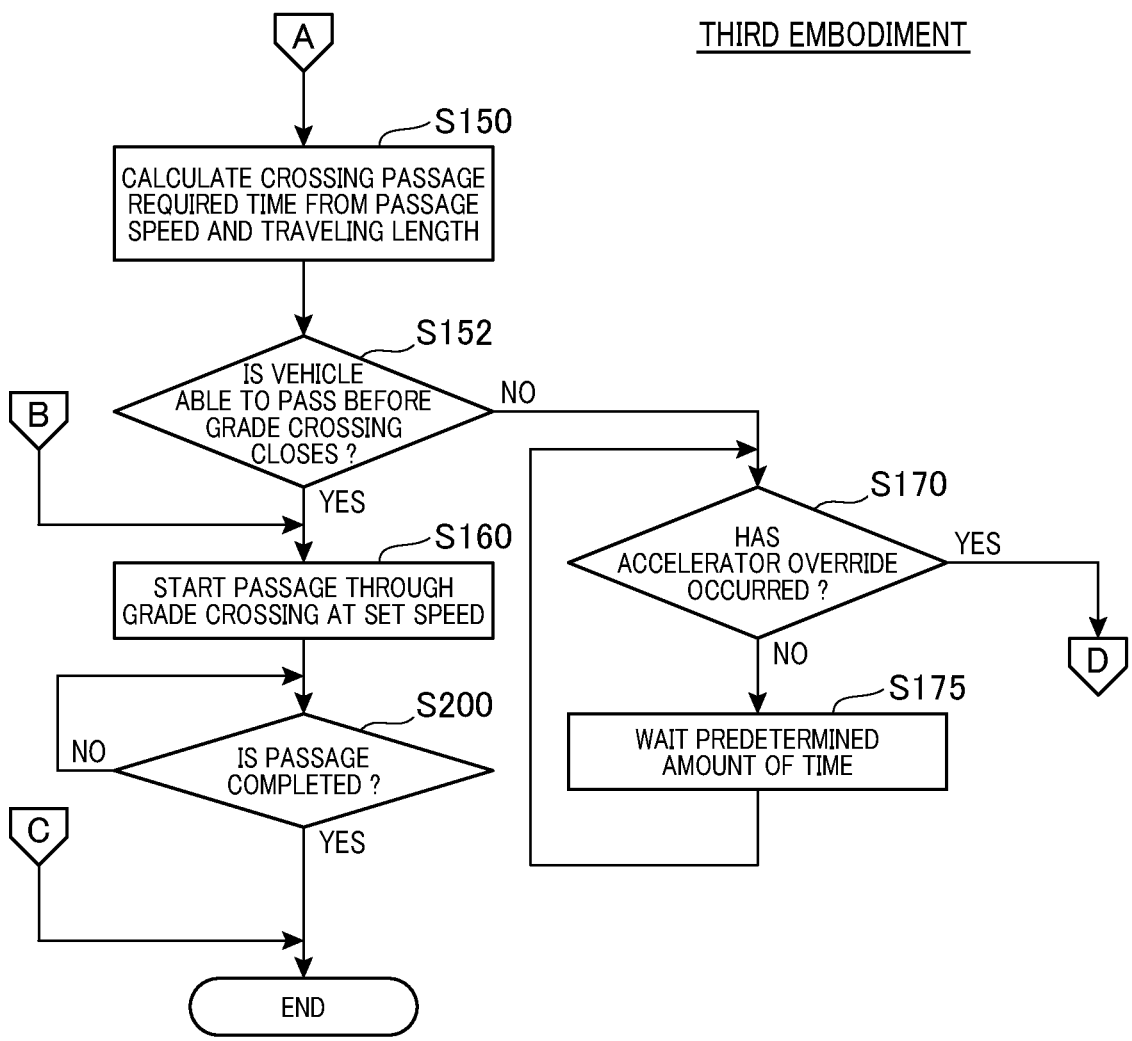
FIG. 11 is a flowchart of the steps in a crossing passage process according to the third embodiment.

As shown in FIG. 10 and FIG. 11, a crossing passage process according to the third embodiment differs from the crossing passage process according to the second embodiment in that steps S144, S146, S148, S150, S152, S170, and S175 are additionally performed. Other steps in the crossing passage process according to the third embodiment are identical to those in the crossing passage process according to the second embodiment. Identical steps are given the same reference numbers and detailed descriptions thereof are omitted.

As shown in FIG. 10, after step S142 is performed, the traveling length identifying unit 116 determines whether communication with the crossing control apparatus 600 can be performed (step S144). For example, this determination may be performed by a test regarding whether communication with the crossing control apparatus 600 can be performed via the wireless control unit 80 being performed and the determination being made based on the result. Alternatively, this determination may be performed by whether a wireless signal that is periodically outputted from the crossing control apparatus 600 is received being determined.

When determined that communication with the crossing control apparatus 600 is able to be performed (YES at step S144), the traveling length identifying unit 116 acquires information related to the length of the grade crossing 900 and time at which the grade crossing 900 is closed from the crossing control apparatus 600 (step S146). As described above, the crossing control apparatus 600 acquires information related to the grade crossing 900 from a management apparatus of a railway company and transmits the information to the own vehicle 100 in response to a request from the own vehicle 100.

The traveling length identifying unit 116 identifies the traveling length when the own vehicle 100 passes through the grade crossing 900 (step S148). As shown in FIG. 11, the passable/not-passable determining unit 112 calculates an amount of time (referred to, hereafter, as a "crossing passage required time") required for the own vehicle 100 to pass through the grade crossing 900 based on the passage speed that is set and the traveling length identified at step S148 (step S150). The passable/not-passable determining unit 112 determines whether the own vehicle 100 is able to pass through the grade crossing 900 before the grade crossing 900 closes (step S152).

Specifically, when an amount of time from a current time until the time at which the grade crossing closes is longer than the crossing passage required time, the passable/not-passable determining unit 112 determines that the own vehicle 100 is able to pass through the grade crossing 900. When the amount of time is shorter, the passable/not-passable determining unit 112 determines that the own vehicle 100 is not able to pass through the grade crossing 900. The passage speed is set based on the clearance at step S142.

Therefore, when the passage speed is high because the clearance is large and the crossing passage required time is short, a likelihood of the own vehicle 100 being able to pass through the grade crossing 900 is high. On the other hand, when the passage speed is low because the clearance is small and the crossing passage required time is long, the own vehicle 100 may not be able to pass through the grade crossing 900. Here, the amount of time from the current time to the time at which the grade crossing closes corresponds to a subordinate concept (i.e., an example) of "threshold time prescribed in advance" in the present disclosure.

When the own vehicle 100 is determined to be able to pass through the grade crossing 900 before the grade crossing closes (YES at step S152), above-described step S160 is performed. On the other hand, when the own vehicle 100 is determined to not be able to pass through the grade crossing 900 before the grade crossing closes (NO at step S152), the driving switching unit 114 determines whether accelerator override by the driver has occurred (step S170).

When accelerator override by the driver is determined to have occurred (YES at step S170), as shown in FIG. 10, above-described step S140 is performed, and automated driving is switched to manual driving. On the other hand, when determined that accelerator override by the driver has not occurred (NO at step S170), as shown in FIG. 11, the driving switching unit 114 waits for a predetermined amount of time (step S175) and performs step S170 again. Therefore, in this case, the own vehicle 100 remains stopped at the stop line before the grade crossing 900.

When communication with the crossing control apparatus 600 is determined to not be able to be performed at above-described step S144 (NO at step S144), as shown in FIG. 11, above-described step S160 is performed.

The vehicle control apparatus 10b according to the third embodiment, described above, achieve effects similar to those of the vehicle control apparatus 10a according to the second embodiment. In addition, the crossing passage required time is calculated based on the identified traveling length and the determined passage speed. The own vehicle 100 is determined to be able to pass through the grade crossing 900 when the calculated crossing passage required time is shorter than the amount of time from the current time to the time at which the grade crossing 900 closes.

Therefore, the own vehicle 100 being unable to complete crossing the grade crossing 900 can be suppressed while safety when the own vehicle 100 passes through the grade crossing 900 is further improved. In addition, when the own vehicle 100 is determined to not be able to pass through the grade crossing 900 before the grade crossing 900 closes, the own vehicle 100 remains stopped at the stop line unless accelerator override by the driver occurs. Therefore, the own vehicle 100 being unable to complete crossing the grade crossing 900 can be suppressed with more certainty.

D. Fourth Embodiment

Figure 12:
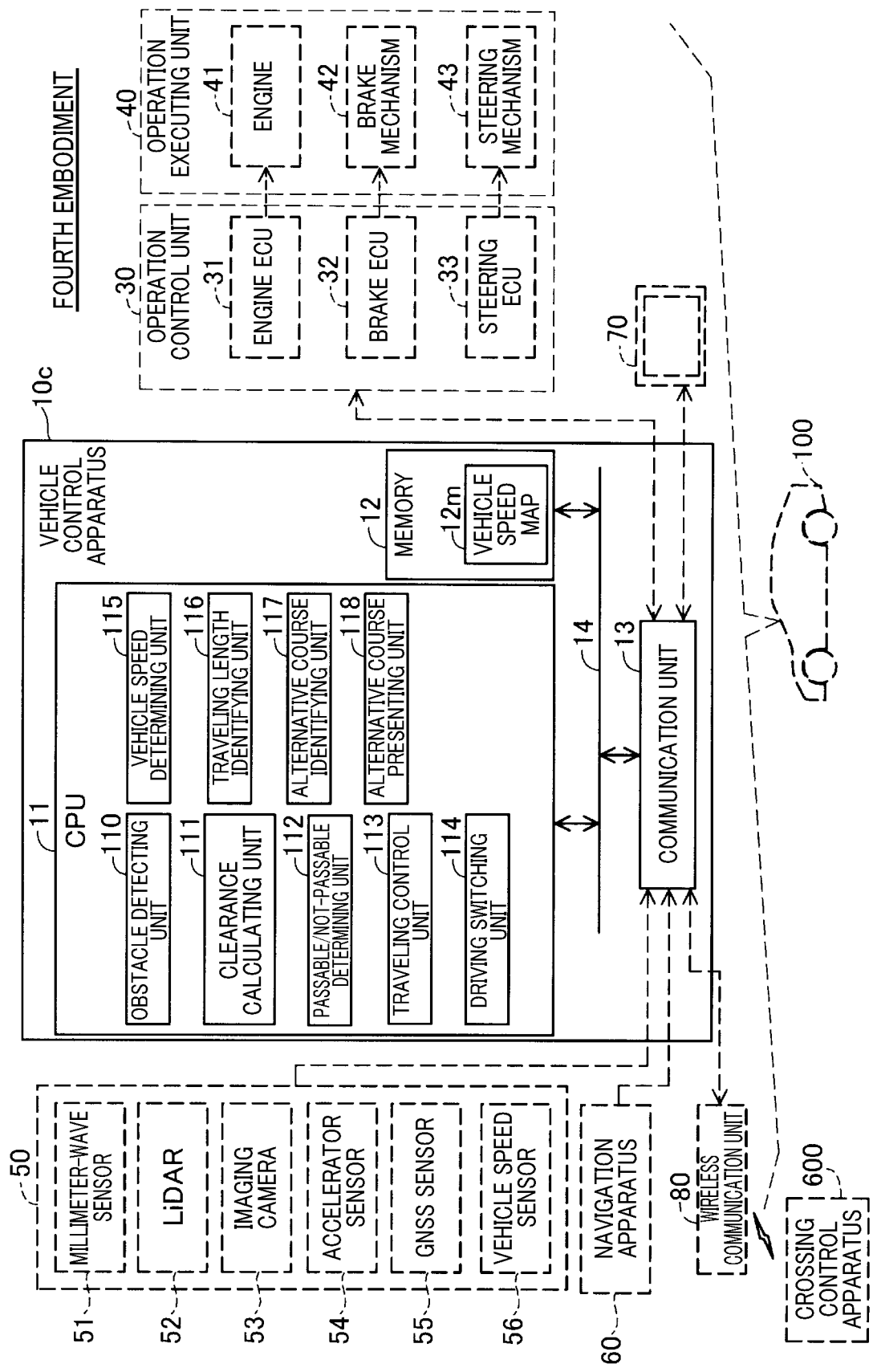
FIG. 12 is a block diagram of an overall configuration of a vehicle in which a vehicle control apparatus according to a fourth embodiment is mounted.

A vehicle control apparatus 10c according to a fourth embodiment shown in FIG. 12 differs from the vehicle control apparatus 10b according to the third embodiment shown in FIG. 9 in that the CPU 11 functions as an alternative course identifying unit 117 and an alternative course presenting unit 118. Other configurations of the vehicle control apparatus 10c according to the fourth embodiment are identical to those of the vehicle control apparatus 10b. Therefore, identical constituent elements are given the same reference numbers and detailed descriptions thereof are omitted.

The alternative course identifying unit 117 identifies an alternative course of the own vehicle 100. For example, the alternative course identifying unit 117 issues a command to the navigation apparatus 60 to retrieve a route that differs from the route that is currently set, acquires the retrieval result, and identifies the alternative course based on the retrieval result. The alternative course presenting unit 118 presents the identified alternative course to the user by displaying the alternative course in the display unit 70.

Figure 13:
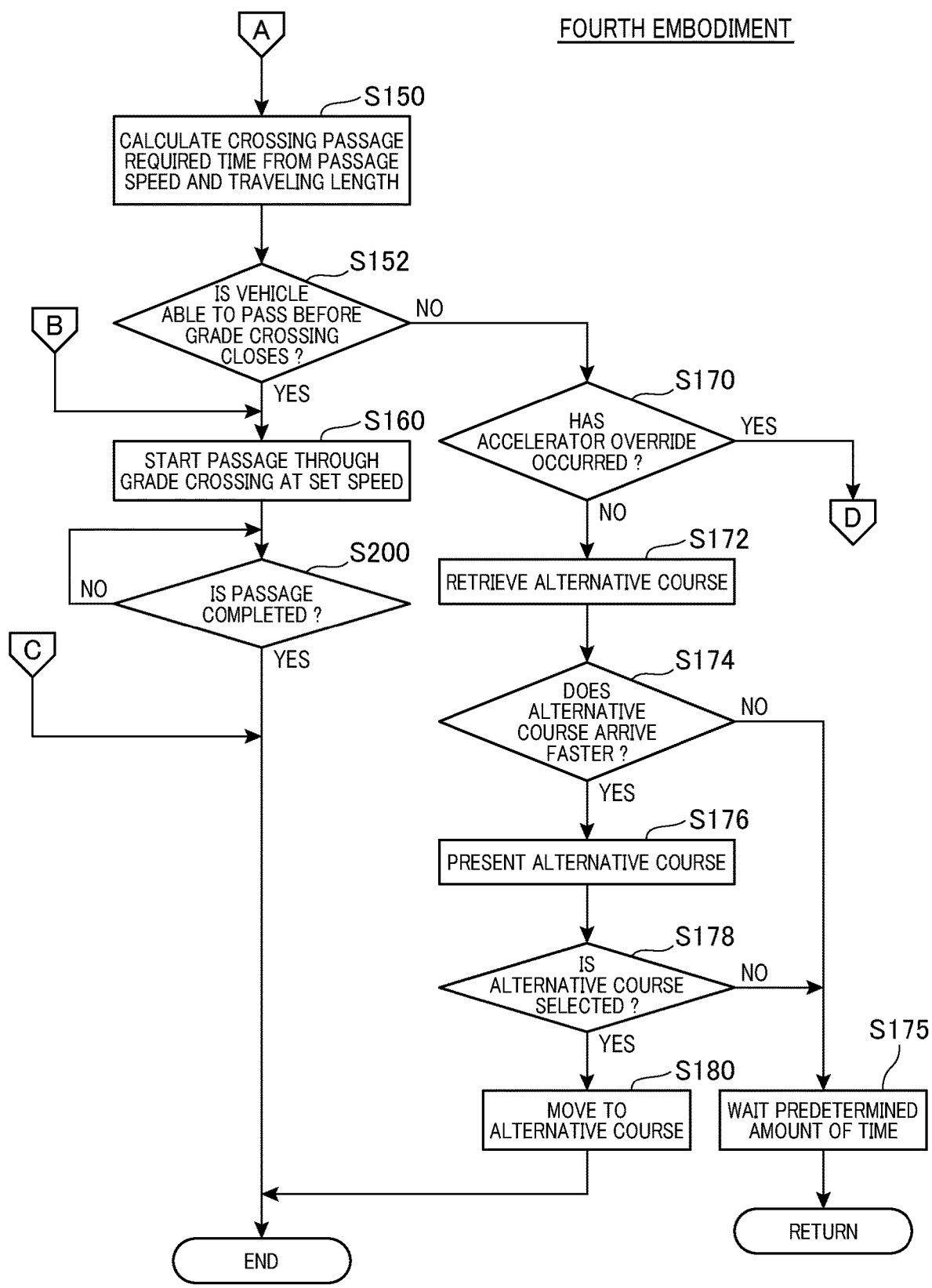
FIG. 13 is a flowchart of the steps in a crossing passage process according to the fourth embodiment.

As shown in FIG. 13, a crossing passage process according to the fourth embodiment differs from the crossing passage process according to the third embodiment in that steps S172, S174, S176, S178, and S180 are additionally performed. Other steps in the crossing passage process according to the fourth embodiment are identical to those in the crossing passage process according to the third embodiment. Identical steps are given the same reference numbers and detailed descriptions thereof are omitted.

When accelerator override by the driver is determined to have not occurred at above-described step S170 (NO at step S170), the alternative course identifying unit 117 retrieves the alternative course using the navigation apparatus 60 (step S172). The alternative course identifying unit 117 determines whether the alternative course found at step S172 arrives faster than the current course (step S174). When the alternative course is determined to arrive at the destination faster than the current course (YES at step S174), the alternative course presenting unit 118 presents the alternative course in the display unit 70 (step S176).

Figure 14:
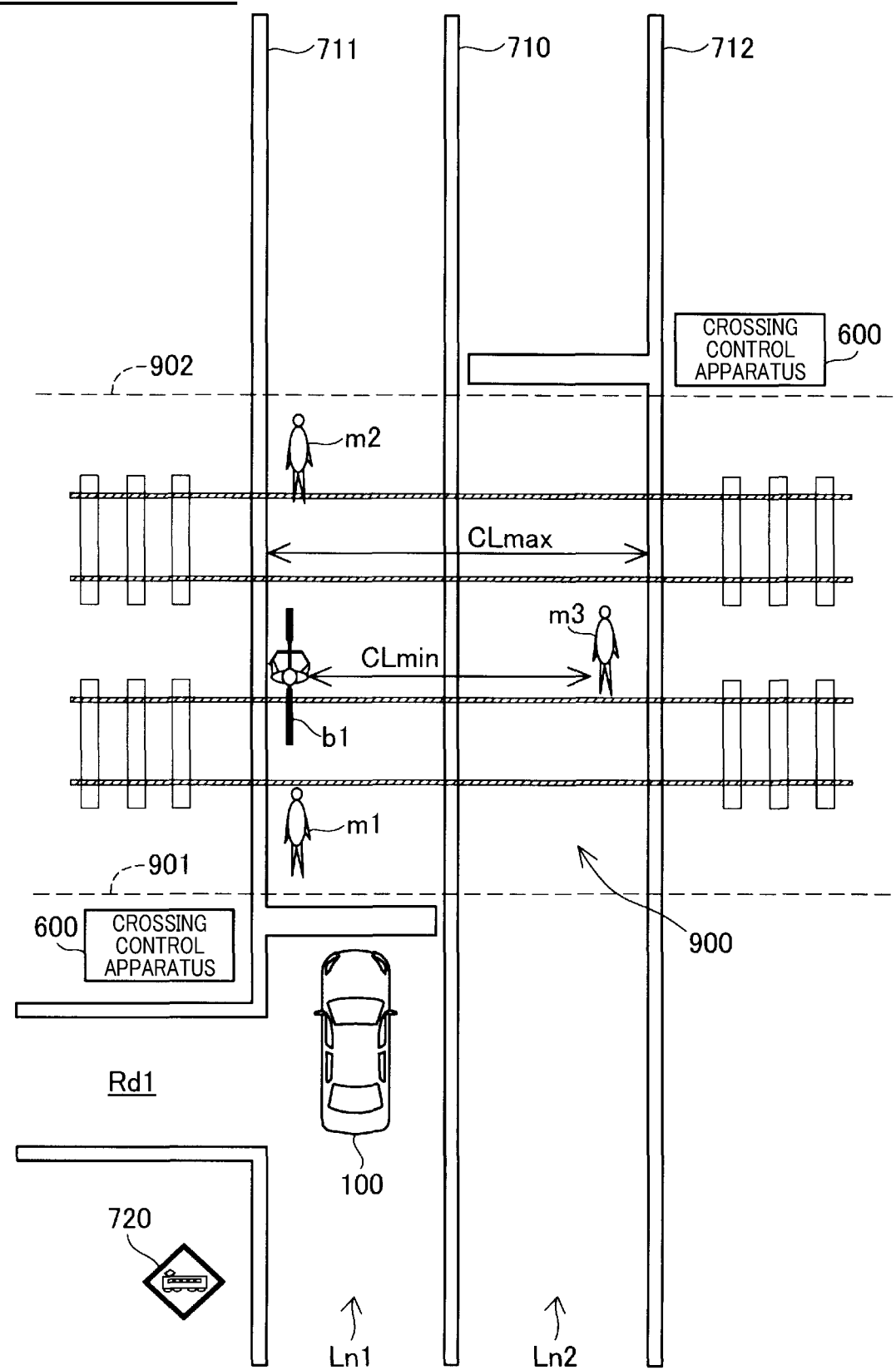
FIG. 14 is an explanatory diagram of an example of a state in which an own vehicle passes through a grade crossing according to the fourth embodiment.

For example, as in an example in FIG. 14, the alternative course is presented when, for the traffic lane Ln1, a road Rd1 to which a left turn is possible is present near the grade crossing 900, a course that takes the road Rd1 is found as an alternative course, and the course is determined to arrive at the destination faster than the current course that passes through the grade crossing 900. When the alternative course is presented, the user can select the alternative course using a user interface (not shown). For example, an operation button that is provided on a steering wheel, or a menu button such as "course reselection" that is displayed in the display unit 70 when the display unit 70 is configured by a touch panel corresponds to the user interface.

After above-described step S176 is performed, the traveling control unit 113 determines whether the alternative course is selected (step S178). When determined that the alternative course is selected (YES at step S178), the traveling control unit 113 moves the own vehicle 100 to the alternative course (step S180).

When the alternative course is determined to not arrive at the destination faster than the current course at above-described step S174 (NO at step S174), and when the alternative course is determined to not be selected at above-described step S178 (NO at step S178), after waiting for a predetermined amount of time (step S175), the vehicle control apparatus 10c returns to above-described step S105. Here, a case in which the alternative course is determined to not be selected corresponds to a case in which an alternative course is determined to not be selected within a predetermined amount of time after the start of step S178.

The vehicle control apparatus 10c according to the fourth embodiment, described above, achieve effects similar to those of the vehicle control apparatus 10b according to the third embodiment. In addition, an alternative course is presented when the own vehicle 100 is determined to not be able to pass through the grade crossing 900 and override is determined to have not occurred. Therefore, the user can move the own vehicle 100 to the alternative course.

E. Fifth Embodiment

Figure 15:
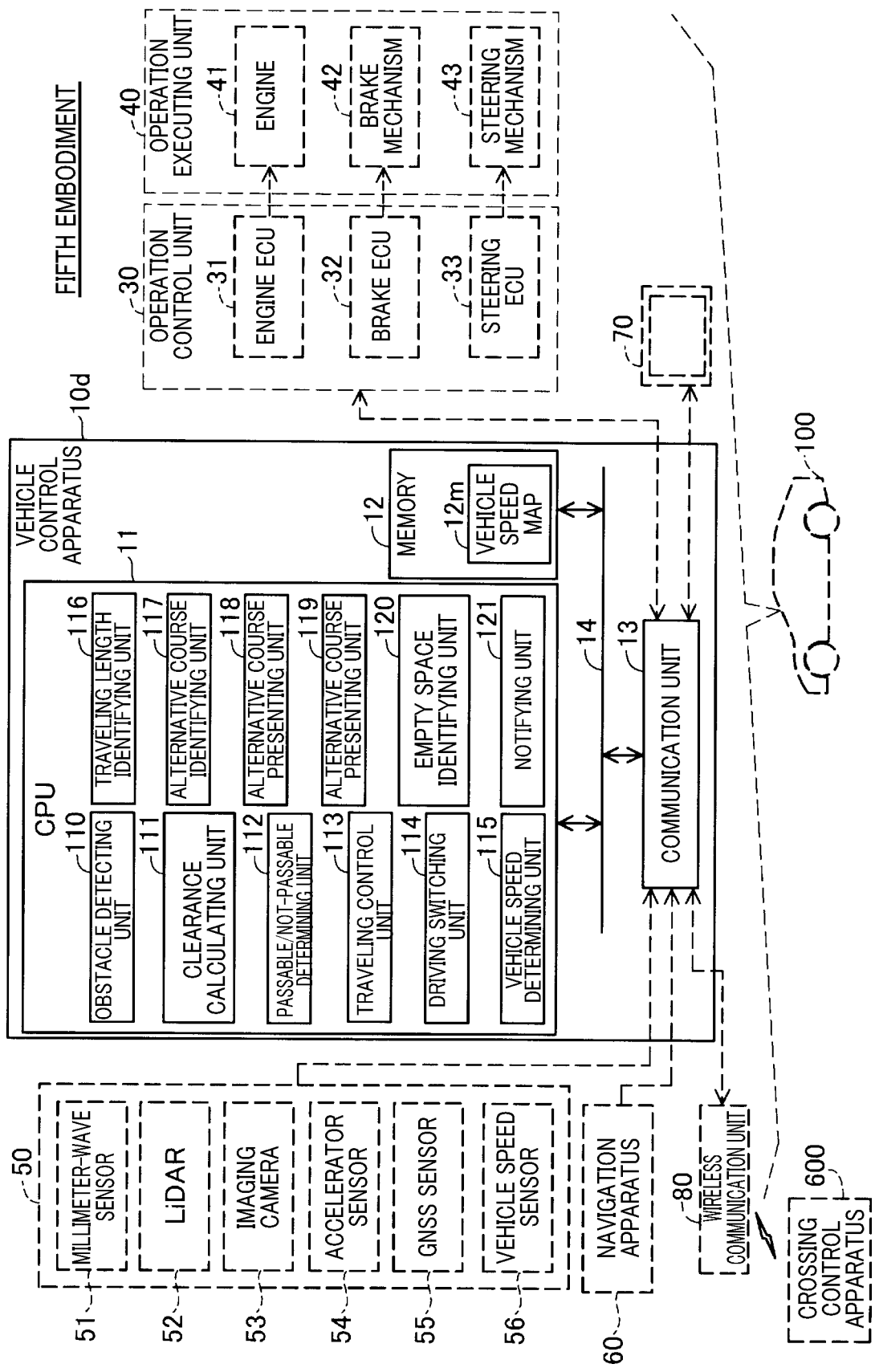
FIG. 15 is a block diagram of an overall configuration of a vehicle in which a vehicle control apparatus according to a fifth embodiment is mounted.

A vehicle control apparatus 10d according to a fifth embodiment shown in FIG. 15 differs from the vehicle control apparatus 10c according to the fourth embodiment shown in FIG. 12 in that the CPU 11 functions as a passage completion determining unit 119, an empty space identifying unit 120, and a notifying unit 121. Other configurations of the vehicle control apparatus 10d according to the fifth embodiment are identical to those of the vehicle control apparatus 10c. Therefore, identical constituent elements are given the same reference numbers and detailed descriptions thereof are omitted.

The passage completion determining unit 119 determines whether passage through the grade crossing 900 can be completed while the own vehicle 100 is passing through the grade crossing 900. Specifically, the passage completion determining unit 119 determines whether passage can be completed based on a presence/absence of an empty space in the traffic lane Ln1 after passage through the grade crossing 900.

When a leading vehicle is stopped in the traffic lane Ln1 after passing through the grade crossing 900, and an empty space in which the own vehicle 100 can stop is not present between the rear end of the leading vehicle and a virtual line 902, the passage completion determining unit 119 determines that passage cannot be completed. The presence/absence of an empty space is determined using the detection results of the sensor group 50.

The empty space identifying unit 120 identifies the presence/absence of an empty space in the traffic lane Ln2 that is the opposing lane after passage through the grade crossing 900 and an empty space to the rear of the own vehicle 100 in the traffic lane Ln1, using the detection results of the sensor group 50, while the own vehicle 100 is passing through the grade crossing 900.

The notifying unit 121 performs notification to the railway company that manages the grade crossing 900. The notification is performed through notification to the crossing control apparatus 600 by wireless communication via the wireless communication unit 80. Here, instead of the notification to the crossing control apparatus 6-0, the notification can be performed through direct communication with the management apparatus of the railway company.

Figure 16:
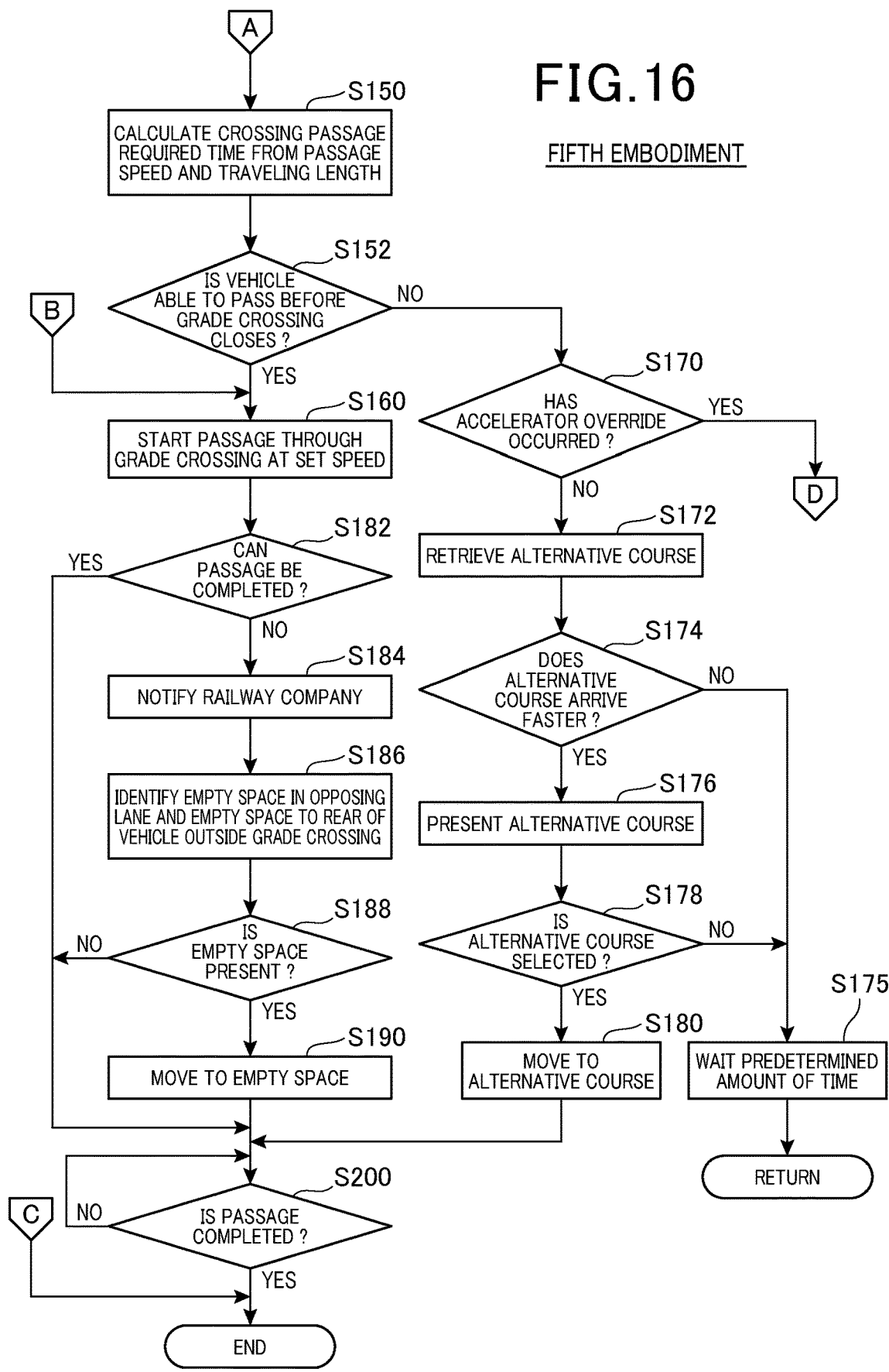
FIG. 16 is a flowchart of the steps in a crossing passage process according to the fifth embodiment.

As shown in FIG. 16, a crossing passage process according to the fifth embodiment differs from the crossing passage process according to the fourth embodiment in that steps S182, S184, S186, S188, and S190 are additionally performed. Other steps in the crossing passage process according to the fifth embodiment are identical to those in the crossing passage process according to the fourth embodiment. Identical steps are given the same reference numbers and detailed descriptions thereof are omitted.

When above-described step S160 is performed and passage through the grade crossing 900 at the set speed is started, the passage completion determining unit 119 determines whether passage through the grade crossing 900 can be completed (step S182). When passage through the grade crossing 900 is determined to be able to be completed (YES at step S182), above-described step S200 is performed.

When passage through the grade crossing 900 is determined to not be able to be completed (NO at step S182), the notifying unit 121 notifies the railway company that manages the grade crossing 900 (step S184). Here, the railway company corresponds to a subordinate concept of an "organization that manages the grade crossing."

The empty space identifying unit 120 identifies the presence/absence of an empty space in the traffic lane Ln2 that is the opposing lane after passage through the grade crossing 900 and an empty space to the rear of the own vehicle 100 in the traffic lane Ln1 (step S186). The empty space identifying unit 120 determines the presence/absence of an empty space based on the identification result at step S186 (step S188). When an empty space is determined to be present (YES at step S188), the traveling control unit 113 moves the own vehicle 100 to the identified empty space (step S190). On the other hand, when the empty space is determined to not be present (NO at step S188), above-described step S120 is performed.

Here, when both the empty space in the traffic lane Ln2 that is the opposing lane after passage of the grade crossing 900 and the empty space to the rear of the own vehicle 100 in the traffic lane Ln1 are identified as being present, at step S190, the own vehicle 100 is moved to the empty space that is larger in the traffic lane Ln1 direction. Here, instead of a larger empty space, the own vehicle 100 may be moved to the empty space that is closer. Alternatively, the own vehicle 100 may be moved to either of the empty spaces that is identified to be present earlier.

F. Other Embodiments

F1. Other Embodiment 1

According to the embodiments, when an obstacle such as a pedestrian or a bicycle is present inside the grade crossing 900, an edge portion of the obstacle in the width direction serves as an edge portion in the calculation of clearance. However, the present disclosure is not limited thereto. Based on the type of obstacle, a margin of a predetermined size may be set for each obstacle and an edge portion of an area that includes the margin may serve as the edge portion in the calculation of clearance.

Figure 17:
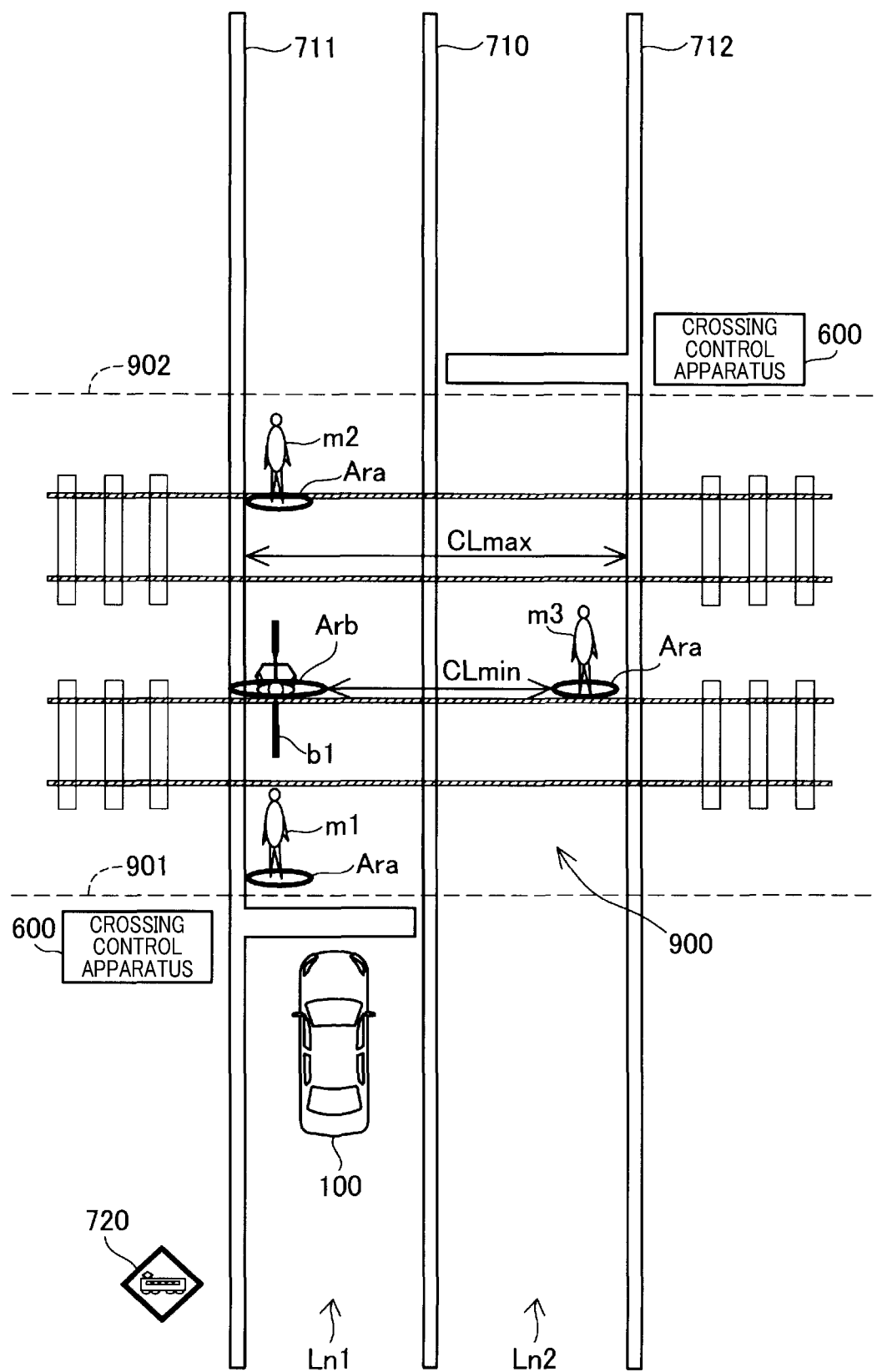
FIG. 17 is an explanatory diagram of an example of a state in which an own vehicle passes through a grade crossing according to another embodiment.

For example, in an example in FIG. 17, a circular margin Ara of a predetermined size is set for each of the pedestrians m1 to m3. A circular margin Arb of a predetermined size is set for the bicycle b1. Therefore, in the example in FIG. 17, the minimum clearance CLmin corresponds to a distance in the intersecting direction between the circular area including the margin Arb of the bicycle b1 and the circular area including the margin Ara of the pedestrian m3. In this configuration, for example, the margin Arb of the bicycle b1 of which the position may suddenly change may be greater than the margin Ara of the pedestrians m1 to m3. In addition, conversely, the margin Ara of the pedestrians m1 to m3 of which movement speed is slow may be greater than the margin Arb of the bicycle b1 of which movement speed is fast.

F2. Other Embodiment 2

According to the embodiments, regarding clearance, of the clearances that change moment by moment, the minimum clearance at each time is calculated in time series and stored. However, the present disclosure is not limited thereto.

For example, an average clearance may be calculated in time series and stored. In this configuration, the passable/not-passable determination and the passage speed determination may be performed using the average clearance. In addition, for example, only the minimum clearance when step S130 is performed may be calculated and stored in the memory 21. In this configuration, the speed and acceleration of the obstacle are not taken into consideration in the calculation of clearance.

F3. Other Embodiment 3

According to the embodiments, the right edge of the passable area is set to a position (white line 712 or center line 710) that differs depending on the presence/absence of an opposing vehicle. However, the right edge may be a fixed position regardless of the presence/absence of an opposing vehicle. For example, the right edge may be fixed to the position of the white line 712 or the position of the center line 710.

F4. Other Embodiment 4

According to the third to fifth embodiments, the length of the grade crossing 900 is acquired from the crossing control apparatus 600 by wireless communication via the wireless communication unit 80. However, the present disclosure is not limited thereto. The length of the grade crossing 900 may be identified using the detection results of the sensor group 50.

For example, a captured image that is acquired by the imaging camera 53 may be analyzed. A distance between the stop line before the grade crossing 900 in the traffic lane Ln1 and the stop line before the grade crossing 900 in the traffic lane Ln2 may be determined. The length of the grade crossing 900 may thereby be identified.

In addition, for example, a crossing gate that is to the front of the grade crossing 900 in the traffic lane Ln1 and a crossing gate that is to the rear may be identified from a captured image, the detection results of the LiDAR 52, or the like. The distance between the crossing gates may be identified as the length of the grade crossing 900.

F5. Other Embodiment 5

According to the first and second embodiments, the "amount of time required for the vehicle 100 to pass through the grade crossing 900" that is used in the calculation of clearance is a fixed value of 30 seconds. However, the present disclosure is not limited thereto. For example, in a manner similar to that in the calculation of the passage required time according to the third embodiment, the "amount of time required for the vehicle 100 to pass through the grade crossing 900" may be calculated from the set passage speed and the length of the grade crossing 900. As a result of the configuration, the clearance (minimum clearance) can be more accurately identified.

F6. Other Embodiment 6

According to the fourth and fifth embodiments, the alternative course is presented when the alternative course arrives at the destination faster. However, the alternative course may be presented even when the alternative course arrives at the destination later or arrives at the same time.

F7. Other Embodiment 7

According to the embodiments, at step S135, when the vehicle 100 is determined to not be able to safely pass through the grade crossing 900 (NO at step S135), automated driving is switched to manual driving (step S140). However, the present disclosure is not limited thereto. In this case, the process may return to step S105. As a result of this configuration, the own vehicle 100 remains stopped at the stop line until the own vehicle 100 is determined to be able to safely pass through the grade crossing 900 at step S135. As a result of this configuration, safety can be improved.

F8. Other Embodiment 8

According to the embodiments, at step S140, all control of the operation functions related to traveling of the own vehicle 100 is assigned to the user (driver). However, instead, only a portion of control may be assigned to the user. For example, only control of the accelerator may be assigned to the user.

F9. Other Embodiment 9

At step S152 according to the third to fifth embodiments, when the amount of time from the current time to the time at which the grade crossing closes is longer than the crossing passage required time, the own vehicle 100 is determined to be able to pass through the grade crossing 900. When the amount of time is equal to or shorter than the crossing passage required time, the own vehicle 100 is determined to not be able to pass through the grade crossing 900. However, the present disclosure is not limited thereto.

For example, when an amount of time that is the amount of time from the current time to the time at which the grade crossing closes to which a predetermined margin is added is longer than the crossing passage required time, the own vehicle 100 may be determined to be able to pass through the grade crossing 900. When the amount of time is shorter than the crossing passage required time, the own vehicle 100 may be determined to not be able to pass through the grade crossing 900.

That is, in general, the crossing passage required time may be calculated based on the traveling length and the passage speed, and the own vehicle 100 may be determined to be able to pass through the crossing when the calculated crossing passage required time is equal to or less than a threshold time that is prescribed in advance.

F10. Other Embodiment 10

According to the fourth and fifth embodiments, step S170 may be omitted. That is, retrieval and presentation of an alternative course, and movement to the alternative course may be performed regardless of the occurrence of override.

F11. Other Embodiment 11

According to the fifth embodiment, the notifying unit 121 and steps S182 and S184 may be omitted. In addition, according to the fifth embodiment, steps S186 to S190 may be omitted.

F12. Other Embodiment 12

According to the embodiments, the white lines 711 and 712, and the center line 710 are arranged inside the grade crossing 900. However, these lines may be omitted. In this configuration, for example, road edges and a center line inside the crossing 90 may be estimated based on a captured image acquired from the imaging camera 53. The passable area may be set using the estimated road edges and center line.

Specifically, the road edges may be identified in a following manner. In many cases, an area inside the grade crossing 900 in which the vehicle can travel is paved and other areas are not paved. Here, the road edges may be estimated by whether the area is a paved road being determined based on the captured image. A boundary between the paved area and the unpaved area can be easily detected as an edge in the captured image. Therefore, the edge can be detected and estimated as the road edge.

Here, an area between the road edges on both sides estimated as described above may be determined as the traveling course. Alternatively, an area between positions on inner sides by a predetermined margin from the road edges on both sides may be determined as the traveling course.

Furthermore, as described above, in addition to estimation of the road edge using the boundary between the paved area and the unpaved area, in a configuration in which a white line is drawn on the road after the grade crossing 900 is crossed, that is, the road on which the vehicle 100 is expected to travel, the white line may be virtually extended to the front of the grade crossing 900, and the virtual white line may be estimated as the road edge. Moreover, the passable area may be set using the road edge that is identified in this manner.

F13. Other Embodiment 13

According to the embodiments, a portion of the configuration that is implemented by hardware may be replaced by software. Conversely, a portion of the configuration that is implemented by software may be replaced by hardware. For example, at least a single functional unit among the obstacle detecting unit 110, the clearance calculating unit 111, the passable/not passable determining unit 112, the traveling control unit 113, the driving switching unit 114, the vehicle speed determining unit 115, the traveling length identifying unit 116, the alternative course identifying unit 117, the alternative course presenting unit 118, the passage completion determining unit 119, the empty space identifying unit 120, and the notifying unit 121 may be implemented by an integrated circuit, a discrete circuit, or a module combining these circuits.

In addition, when a portion or all of the functions of the present disclosure are implemented by software, the software (computer program) can be presented in a form in which the software is stored in a computer-readable storage medium. The "computer-readable storage medium" is not limited to a portable storage medium such as a flexible disk or a compact disc read-only memory (CD-ROM), but also includes an internal storage unit inside a computer, such as various random-access memories (RAMs) and read-only memories (ROMs), and an external storage medium such as a hard disk that is fixed to the computer. That is, the "computer-readable storage medium" has a wide interpretation that includes arbitrary storage media that can store a data packet fixedly rather than temporarily.

The present disclosure is not limited to the above-described embodiments. The present disclosure can be implemented through various configurations without departing from the spirit of the disclosure. For example, technical features according to the embodiments can be replaced and combined as appropriate to solve some or all of the above-described issued or to achieve some or all of the above-described effects. Furthermore, the technical features may be omitted as appropriate unless described as a requisite in the present specification.

What is claimed is:

1. A vehicle control apparatus that is mounted in a vehicle and controls the vehicle, the vehicle control apparatus being implemented using one or more processors and being configured to perform operations comprising:
    detecting that the vehicle is approaching a grade crossing that intersects a traveling course of the vehicle, the detecting of the grade crossing being based on one or more detection results of a sensor group that includes one or more sensors mounted on the vehicle and
    performing a grade crossing process in response to the detecting that the vehicle is approaching the grade crossing and in response to determining that a current position of the vehicle, as indicated by the one or more detection results, is within a predetermined distance from the grade crossing, the grade crossing process including:
    detecting that an obstacle is present inside the grade crossing, using the one or more detection results;
    identifying a position and size of the obstacle using the one or more detection results,
    identifying, for when the vehicle passes through the grade crossing, a passable area in the grade crossing that is a maximum area through which the vehicle is able to pass when the obstacle is not present,
    determining whether an opposing vehicle is present in an opposing lane of the traveling course of the vehicle within the grade crossing using the one or more detection results of the sensor,
    setting, in response to the opposing vehicle being determined to be present in the opposing lane within the grade crossing, a fixed and visible center line within the grade crossing that separates the opposing lane from an own lane of the vehicle as a first edge of the passable area of the grade crossing,
    setting, in response to the opposing vehicle being determined not to be present in the opposing lane within the grade crossing, an edge line that corresponds to an edge of the opposing lane as the first edge of the passable area of the grade crossing,
    calculating a clearance for travel by the vehicle within the grade crossing in a direction that intersects the traveling course when the vehicle crosses into the grade crossing, using the identified position and size of the obstacle and the identified passable area; and
    determining whether the vehicle is able to pass through the grade crossing based on the calculated clearance such that the determining as to whether the vehicle is able to pass through the grade crossing is based on:
        detecting that the obstacle is within the grade crossing,
        the identified position and size of the obstacle as detected as being in the grade crossing,
        whether the opposing vehicle is detected as being in the grade crossing, and
        a size of the identified passable area of the grade crossing as determined based on whether the opposing vehicle is detected as being in the grade crossing,
    wherein the vehicle performs one or more control operations based on the determination as to whether the vehicle is able to pass through the grade crossing, the one or more control operations comprising:
        passing through the grade crossing in response to determining that the vehicle is able to pass through the grade crossing;
        stopping the vehicle and not allowing the vehicle to pass through the grade crossing in response to determining that the vehicle is not able to pass through the grade crossing; and
        assigning control of at least a portion of operation functions related to driving of the vehicle to a driver of the vehicle in response to determining that the vehicle is not able to pass through the grade crossing.

2. The vehicle control apparatus according to claim 1, wherein:
    the clearance is calculated using, as the size of the obstacle, a size that is obtained by a margin that is prescribed in advance being added to the detected size of the obstacle in the intersecting direction.

* * * * *